US010985633B2

(12) United States Patent
Shahosseini et al.

(10) Patent No.: US 10,985,633 B2
(45) Date of Patent: Apr. 20, 2021

(54) VIBRATIONAL ENERGY HARVESTER WITH AMPLIFIER HAVING GEAR ASSEMBLY

(71) Applicant: THE REGENTS OF THE UNIVERSITY OF MICHIGAN, Ann Arbor, MI (US)

(72) Inventors: Iman Shahosseini, Ann Arbor, MI (US); Khalil Najafi, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 473 days.

(21) Appl. No.: 15/317,327

(22) PCT Filed: Jun. 10, 2014

(86) PCT No.: PCT/US2014/041738
§ 371 (c)(1),
(2) Date: Dec. 8, 2016

(87) PCT Pub. No.: WO2015/191047
PCT Pub. Date: Dec. 17, 2015

(65) Prior Publication Data
US 2017/0117775 A1    Apr. 27, 2017

(51) Int. Cl.
*H02K 7/06* (2006.01)
*H02K 7/116* (2006.01)
(Continued)

(52) U.S. Cl.
CPC .......... *H02K 7/1876* (2013.01); *F04B 19/22* (2013.01); *F16H 19/04* (2013.01); *F16H 21/44* (2013.01); *H02K 7/116* (2013.01); *H02K 35/00* (2013.01)

(58) Field of Classification Search
CPC .......... F04B 19/22; F16H 21/44; F16H 19/04; H02K 7/116; H02K 7/1869; H02K 7/1876; H02K 7/1892; H02K 35/00
(Continued)

(56) References Cited

U.S. PATENT DOCUMENTS 357,374 A * 2/1887 Darling et al. ........ H02K 7/065
                                                       310/23
1,864,499 A * 6/1932 Russell ................. F03B 13/186
                                                       290/42
(Continued)

FOREIGN PATENT DOCUMENTS

CA      2173580 A1    4/1995
EP      0046006 A2    2/1982
(Continued)

OTHER PUBLICATIONS

International Search Report and Written Opinion of the ISA for PCT/US2014/041738, ISA/KR, Seo-gu, Daejeon Metropolitan City, dated Feb. 25, 2015.
(Continued)

*Primary Examiner* — Tulsidas C Patel
*Assistant Examiner* — S. Mikailoff
(74) *Attorney, Agent, or Firm* — Harness, Dickey & Pierce, P.L.C.

(57) ABSTRACT

An energy harvester coupled to a vibration source includes a housing, a transducer, and an amplifier. The transducer may have a first part and a second part. The first part and the second part may move relative to each other along a central axis in response to a motion from the vibration source. The amplifier is coupled to the housing and operable to amplify an amplitude of the motion received from the vibration source. The amplifier has an input member coupled to the vibration source and an output member coupled to the first
(Continued)

part of the transducer. The input member moves at a distance D1 in response to the motion from the vibration source. The output member moves the first part of the transducer in response to the input member moving. The first part of the transducer moves along the central axis by a distance D2, where D2>D1.

16 Claims, 16 Drawing Sheets

(51) Int. Cl.
    *H02K 35/00*     (2006.01)
    *H02K 7/18*     (2006.01)
    *F04B 19/22*     (2006.01)
    *F16H 19/04*     (2006.01)
    *F16H 21/44*     (2006.01)

(58) Field of Classification Search
    USPC ........................ 185/27, 29, 32, 33
    See application file for complete search history.

(56) References Cited

U.S. PATENT DOCUMENTS

| | | | | |
|---|---|---|---|---|
| 1,916,873 A * | 7/1933 | Wiggins | F03G 7/08 | 185/27 |
| 2,346,643 A * | 4/1944 | Barnett | B60K 25/00 | 185/27 |
| 3,028,727 A * | 4/1962 | Anston | F03G 3/00 | 185/27 |
| 3,050,943 A * | 8/1962 | Thorel | F16B 1/00 | 310/12.04 |
| 3,112,374 A | 11/1963 | Görike | | |
| 3,250,140 A * | 5/1966 | Russell | F03G 3/00 | 185/29 |
| 3,263,515 A * | 8/1966 | Adamski | F16H 21/44 | 296/117 |
| 3,676,719 A * | 7/1972 | Pecci | H02K 7/065 | 310/24 |
| 3,885,163 A * | 5/1975 | Toberman | F03G 7/08 | 290/1 R |
| 3,944,855 A * | 3/1976 | Le Van | F03G 7/08 | 310/69 |
| 4,151,758 A * | 5/1979 | Natalie | F16H 21/26 | 248/277.1 |
| 4,387,781 A * | 6/1983 | Ezell | B60G 13/14 | 180/65.22 |
| 4,418,542 A * | 12/1983 | Ferrell | F04B 9/00 | 417/229 |
| 4,500,827 A * | 2/1985 | Merritt | H02K 35/04 | 290/1 R |
| 4,507,579 A * | 3/1985 | Turner | H02K 33/14 | 310/15 |
| 4,536,668 A * | 8/1985 | Boyer | B60C 23/041 | 180/65.51 |
| 5,446,319 A * | 8/1995 | Pawlowski | H02K 7/065 | 290/1 R |
| 5,488,287 A * | 1/1996 | Kemner | H02K 21/14 | 322/20 |
| 5,585,711 A * | 12/1996 | Kemner | B60K 25/08 | 322/46 |
| 5,713,427 A * | 2/1998 | Lutz | B60K 1/02 | 180/65.245 |
| 5,828,135 A * | 10/1998 | Barrett | B60T 1/10 | 290/3 |
| 6,091,159 A * | 7/2000 | Galich | F03G 7/08 | 290/1 R |
| 6,220,719 B1 | 4/2001 | Vetorino et al. | | |
| 6,281,594 B1 * | 8/2001 | Sarich | A43B 3/00 | 290/1 A |
| 6,376,925 B1 * | 4/2002 | Galich | F03G 7/08 | 290/1 R |
| 6,798,090 B2 | 9/2004 | Cheung et al. | | |
| 6,807,282 B2 | 10/2004 | Kaneda et al. | | |
| 6,809,426 B2 * | 10/2004 | Naar | B60K 25/08 | 290/1 R |
| 6,936,937 B2 | 8/2005 | Tu et al. | | |
| 6,952,060 B2 | 10/2005 | Goldner et al. | | |
| 7,105,958 B1 * | 9/2006 | Elmaleh | H02K 7/075 | 310/24 |
| 7,408,266 B2 * | 8/2008 | Yeh | B62J 6/10 | 290/1 A |
| 7,530,761 B2 * | 5/2009 | Kenney | F01D 17/26 | 404/17 |
| 7,541,684 B1 * | 6/2009 | Valentino | B60L 7/16 | 290/1 R |
| 7,589,427 B2 * | 9/2009 | Davis | F03G 7/08 | 290/1 R |
| 7,654,540 B2 | 2/2010 | Parison et al. | | |
| 7,719,416 B2 | 5/2010 | Arms et al. | | |
| 7,841,177 B1 * | 11/2010 | Detwiler | F03B 13/186 | 290/53 |
| 7,868,475 B1 * | 1/2011 | Bradford | H02K 7/1853 | 290/1 R |
| 7,913,783 B2 * | 3/2011 | Elmaleh | B60K 25/00 | 180/65.31 |
| 7,977,852 B2 | 7/2011 | Ward et al. | | |
| 8,069,794 B2 * | 12/2011 | Satloff | F03G 5/06 | 108/50.02 |
| 8,164,204 B2 * | 4/2012 | Jang | F03B 13/00 | 290/1 R |
| 8,446,022 B2 * | 5/2013 | Jiang | F03G 7/08 | 290/1 R |
| 8,450,866 B2 | 5/2013 | Despesse | | |
| 8,710,684 B2 * | 4/2014 | Chiu | F03G 7/08 | 290/1 C |
| 8,772,991 B2 * | 7/2014 | Yamamoto | B60K 7/0007 | 310/75 R |
| 8,922,097 B2 | 12/2014 | Vijayakumar | | |
| 8,928,161 B2 * | 1/2015 | Loverich | F03G 5/06 | 290/1 R |
| 8,941,251 B2 * | 1/2015 | Zuo | B60G 17/06 | 290/1 R |
| 9,030,033 B2 * | 5/2015 | Yoo | B60G 7/02 | 180/165 |
| 10,734,877 B2 * | 8/2020 | Shahosseini | H02K 16/00 | |
| 2002/0047483 A1 | 4/2002 | Oohashi | H02K 1/16 | 310/263 |
| 2002/0089309 A1 * | 7/2002 | Kenney | H02K 7/1853 | 322/1 |
| 2002/0167236 A1 * | 11/2002 | Long | A63H 33/26 | 310/80 |
| 2003/0015928 A1 * | 1/2003 | Asao | H01L 25/115 | 310/68 D |
| 2004/0007881 A1 * | 1/2004 | Kobashikawa | B01D 61/10 | 290/53 |
| 2004/0066107 A1 | 4/2004 | Gery | | |
| 2004/0160058 A1 * | 8/2004 | Gott | F03G 7/08 | 290/1 R |
| 2007/0090703 A1 * | 4/2007 | Yeh | B62J 6/10 | 310/83 |
| 2007/0181372 A1 * | 8/2007 | Davis | F03G 7/08 | 185/27 |
| 2007/0264081 A1 * | 11/2007 | Chiu | E01C 9/00 | 404/71 |
| 2009/0127976 A1 | 5/2009 | Ward et al. | | |
| 2009/0158868 A1 * | 6/2009 | Farmer | B60G 21/0556 | 74/49 |
| 2009/0189470 A1 * | 7/2009 | McClellan | H01F 7/0278 | 310/154.29 |
| 2009/0243301 A1 * | 10/2009 | Longtin | F03D 7/02 | 290/55 |
| 2010/0060009 A1 * | 3/2010 | Elmaleh | H02P 9/04 | 290/55 |
| 2011/0187125 A1 * | 8/2011 | Jang | F03B 13/00 | 290/1 C |
| 2011/0215593 A1 * | 9/2011 | Chang | H02K 99/00 | 290/1 R |

(56) References Cited

U.S. PATENT DOCUMENTS

| | | | |
|---|---|---|---|
| 2012/0091724 A1* | 4/2012 | Bodenstein | H02K 7/102 290/55 |
| 2012/0091828 A1 | 4/2012 | Despesse | |
| 2012/0098357 A1* | 4/2012 | Hunstable | H02K 35/04 310/20 |
| 2012/0280592 A1 | 11/2012 | Penn | |
| 2012/0326449 A1* | 12/2012 | Liao | H02K 7/116 290/1 C |
| 2012/0326573 A1* | 12/2012 | Yamamoto | F16H 1/32 310/67 R |
| 2013/0008157 A1 | 1/2013 | Zuo et al. | |
| 2013/0009450 A1* | 1/2013 | Suzuki | H02K 7/116 301/6.5 |
| 2013/0069486 A1 | 3/2013 | Vijayakumar | |
| 2013/0127175 A1 | 5/2013 | Zuo et al. | |
| 2013/0317627 A1* | 11/2013 | Loverich | F03G 5/06 623/26 |
| 2014/0132007 A1* | 5/2014 | Yoo | B60G 7/02 290/1 C |
| 2014/0152125 A1* | 6/2014 | Gray | H02K 7/1876 310/24 |
| 2015/0021974 A1* | 1/2015 | Suzuki | B60K 7/0007 301/6.5 |
| 2015/0135869 A1 | 5/2015 | Jia et al. | |
| 2015/0313519 A1* | 11/2015 | McKenna | A61B 5/14551 600/324 |
| 2017/0117775 A1* | 4/2017 | Shahosseini | H02K 7/1876 |
| 2017/0126110 A1* | 5/2017 | Shahosseini | H02P 25/06 |
| 2018/0248459 A1* | 8/2018 | Al-Jobory | H02K 53/00 |
| 2020/0130435 A1* | 4/2020 | Root | H02K 7/116 |
| 2020/0130437 A1* | 4/2020 | Root | H02K 7/1846 |

FOREIGN PATENT DOCUMENTS

| | | | | |
|---|---|---|---|---|
| EP | 0732035 A1 | 9/1996 | | |
| EP | 0845920 A2 | 6/1998 | | |
| EP | 0990961 A1 | 4/2000 | | |
| EP | 1194002 A2 | 4/2002 | | |
| EP | 2346149 A1 | 7/2011 | | |
| GB | 2065983 A * | 7/1981 | | H02K 7/075 |
| JP | 2010-154688 A | 7/2010 | | |
| JP | 2012-531180 A | 12/2012 | | |
| KR | 101061591 B1 | 9/2011 | | |
| KR | 1020130034818 A | 4/2013 | | |
| WO | WO-2008010669 A1 * | 1/2008 | | H02K 7/1846 |
| WO | WO-2009-121104 A1 | 10/2009 | | |
| WO | WO-2011-144591 A1 | 11/2011 | | |
| WO | WO-2013-175449 A2 | 11/2013 | | |

OTHER PUBLICATIONS

Antaki, James F. et al., "A Gait-Powered Autologous Battery Charging System for Artificial Organs," Artificial Heart and Lung Program and the Rehabilitation Technology Program, University of Pittsburgh, the Bioengineering Department, Carnegie Mellon University, Pittsburgh, Pennsylvania, and Nimbus, Inc., Rancho Cordova, California, 1995, pp. M588-M595.

* cited by examiner

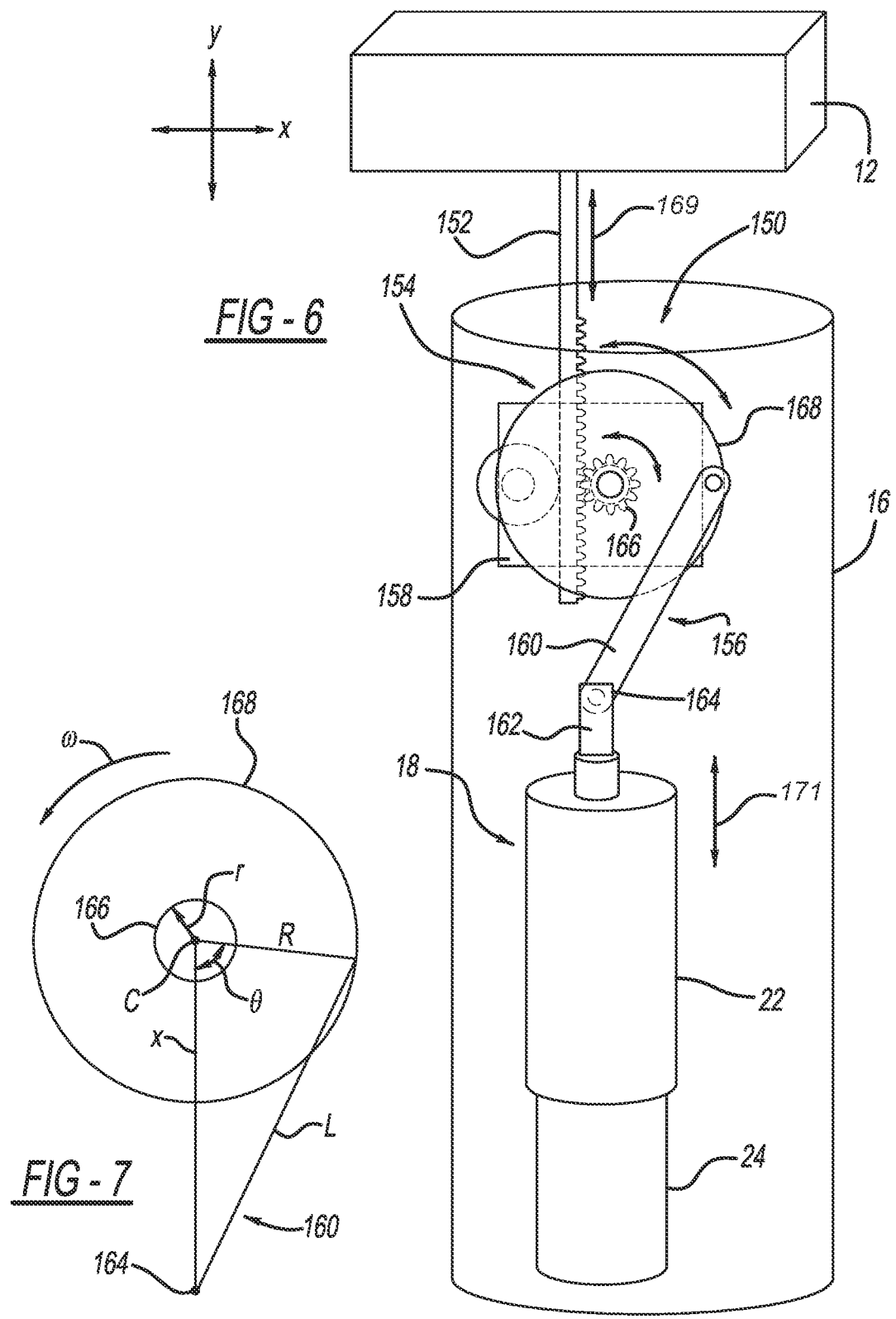

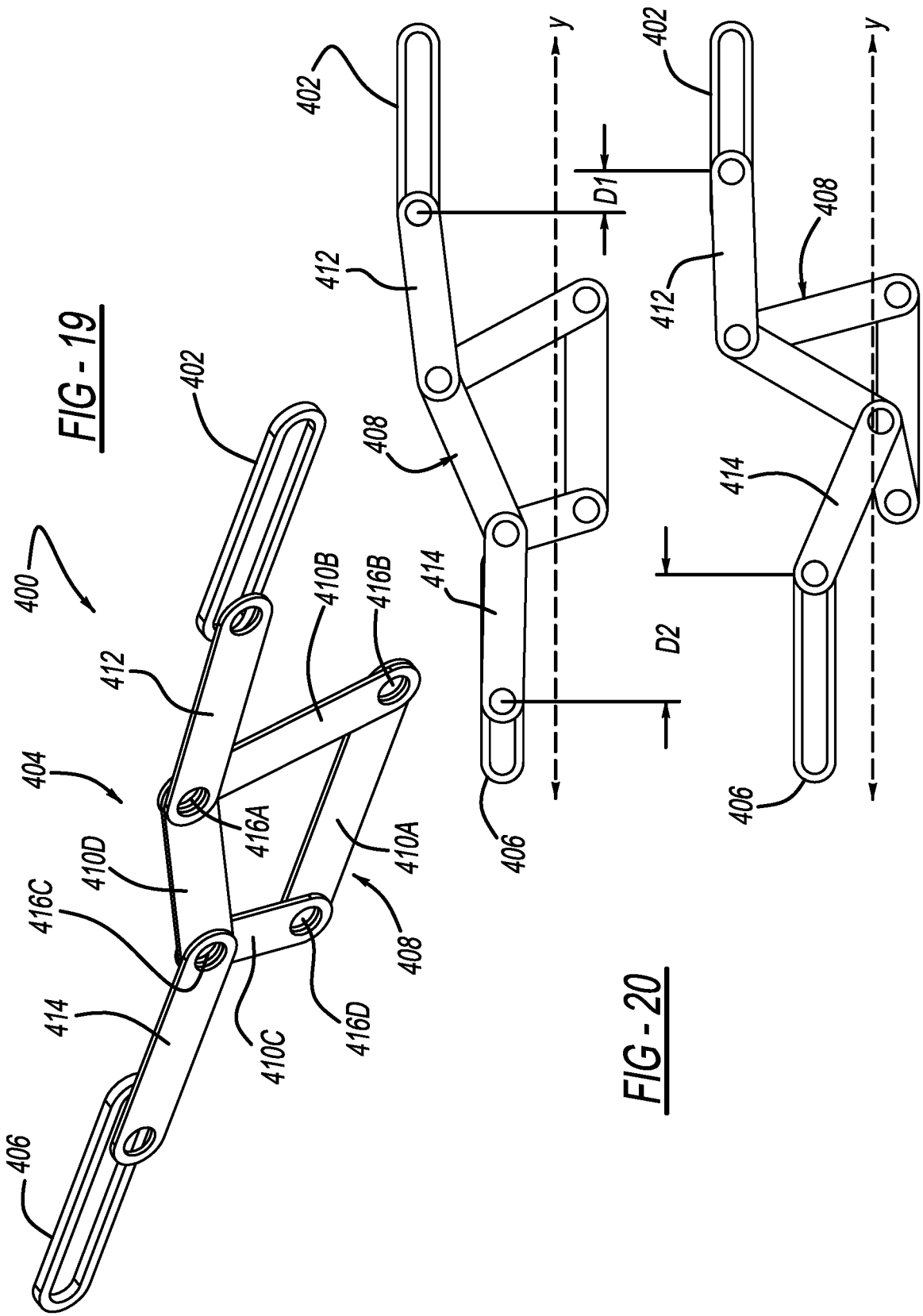

US 10,985,633 B2

VIBRATIONAL ENERGY HARVESTER WITH AMPLIFIER HAVING GEAR ASSEMBLY

CROSS-REFERENCE TO RELATED APPLICATIONS

This application is a 371 U.S. National Stage of International Application No. PCT/US2014/041738, filed Jun. 10, 2014. The disclosures of the above application are incorporated herein by reference.

FIELD

The present disclosure relates to an amplifier, and, more particularly, to a mechanical amplifier for an energy harvester having a transducer.

BACKGROUND

An energy harvester, which may include a transducer, harvests energy from external sources, such as environmental vibrations. A transducer converts vibrational energy to other forms of energy, such as electrical energy, which can be used for various functions. For example, the energy may be stored to power a device, and/or be used to monitor the conditions of a dynamic system like a sensor. The energy may also be translated to a mechanical motion, such that the transducer acts like an actuator.

The transducer can include movable components. More particularly, one component of the transducer may move relative to the other component. For example, the transducer may include a magnetic structure and a coil structure which move relative to one another. As part of the energy harvester, the magnetic structure and the coil structure move relative to each other in response to kinetic energy from a vibration source. The relative movement causes a variation in the electromagnetic field, thereby generating electrical potential across the coil structure. In addition to an electromagnetic type of transducer, an energy harvester can include a transducer that generates energy based on, for example, piezoelectric, electrostatic, magnetostrictive, and/or electrostrictive actuation.

The amount of energy converted by the transducer can be increased by way of an amplifier. Specifically, the energy harvester may include an amplifier disposed between a vibration source and the transducer. The amplifier increases the energy received from the vibration source and provides the amplified energy to the transducer.

This section provides background information related to the present disclosure which is not necessarily prior art.

SUMMARY

This section provides a general summary of the disclosure, and is not a comprehensive disclosure of its full scope or all of its features.

An energy harvester is provided in the present disclosure. The energy harvester can be coupled to a vibration source, and include a housing, a transducer, and an amplifier. The transducer may generate an electrical signal, and reside in the housing. The transducer may have a first part and a second part. The first part and the second part are configured to move relative to each other along a central axis in response to a motion from the vibration source to generate the electrical signal. The amplifier may be coupled to the housing and is operable to amplify an amplitude of the motion received from the vibration source. The amplifier has an input member coupled to the vibration source and an output member coupled to the first part of the transducer. The input member moves at a distance D1 in response to the motion from the vibration source, and the output member moves the first part of the transducer in response to the input member moving, the first part of the transducer moves relative to the second part of the transducer along the central axis by a distance D2 which is greater than D1.

In an aspect of the present disclosure, the amplifier may include a plurality of links and a plurality of joints. The plurality of joints join two or more links from among the plurality of links to form a linkage assembly that moves in a predefined motion in response to the motion from the vibration source. The input member is coupled to one end of the linkage assembly and the output member is coupled to the other end of the linkage assembly.

In an aspect of the present disclosure, the amplifier, which may have the linkage assembly, may further include an input slider and an output slider. The input slider may be coupled to the housing, and a first end of the linkage assembly slidingly moves along the input slider. The output slider may be coupled to the housing, and a second end of the linkage assembly opposite the first end slidingly moves along the output slider. The first end of the linkage assembly is coupled to the vibration source via the input member, and the second end of the linkage assembly is coupled to the first part of the transducer via the output member.

In an aspect of the present disclosure the amplifier, which may have the linkage assembly may further include a slider coupled to the housing and a plurality of rods. The rods couple the linkage assembly to the slider such that the linkage assembly moves along the slider. A first rod from among the plurality of rods is coupled to the vibration source via the input member, and a second rod from among the plurality of rods is coupled to the first part of the transducer via the output member. The first rod and the second rod move along the slider in response to the motion from the vibration source such that the first rod moves the distance D1 and the second rod moves the distance D2 which is greater than D1.

In an aspect of the present disclosure, the amplifier may include a hydraulic pump, an input piston, and an output piston. The hydraulic pump has a body that defines a first chamber and a second chamber smaller than the first chamber, and the body retains hydraulic fluid. The input piston moves within the first chamber of the hydraulic pump, and, as the input member is coupled to the vibration source. The output piston moves within the second chamber of the hydraulic pump, and, as the output member, is coupled to the first part of the transducer. The input piston displaces the hydraulic fluid in the hydraulic pump in response to the motion from the vibration source, and the hydraulic pump displaces the output piston in response to the input piston moving.

In an aspect of the present disclosure, the input piston of the amplifier has a surface size of S1 and the output piston has a surface size of S2 which is less than S1. The input piston travels the distance D1 in response to the motion from the vibration source and the output piston travels the distance D2 in response to the hydraulic fluid displaced by the input piston. The distance D2 over the distance D1 is substantially proportional to S1/S2.

In an aspect of the present disclosure, the amplifier may include a frame, a shaft, and a lever. The frame may be coupled to the housing. The shaft may be coupled to the frame and pivots about a central shaft axis. The lever may be coupled to the shaft, and pivots with the shaft about the central shaft axis. The lever is coupled to the vibration source via the input member and to the first part of the transducer via the output member such that the vibration source is coupled to the lever at a first length L1 from the central shaft axis and the first part of the transducer is coupled to the lever at a second length L2 from the central shaft axis, and L2>L1.

In an aspect of the present disclosure, for the amplifier which may include the frame, the shaft, and the lever, the distance D2 travelled by the first part of the transducer over the distance D1 travelled by the input member is substantially proportional to L2/L1.

In an aspect of the present disclosure, the amplifier may include a frame, a shaft, a first link, and a second link. The shaft may be coupled to the frame and pivots about a central shaft axis. The first link may be coupled to the shaft at one end, and, as the input member, is coupled to the vibration source at the other end. The second link may be coupled to the shaft at one end, and, as the output member, is coupled to the first part of the transducer at the other end. The first link and the second link move along an axis parallel with the central axis in response to the shaft pivoting about the central shaft axis. The first link is coupled to the shaft at a first length L1 from the central shaft axis and the second link is coupled to the shaft at a second length L2 from the central shaft axis, and L2>L1.

In an aspect of the present disclosure, for the amplifier which may include the frame, the shaft, the first link, and the second link, the distance D2 travelled by the first part of the transducer over the distance D1 travelled by the input member is substantially proportional to L2/L1.

In an aspect of the present disclosure, the amplifier may include a gear assembly. The gear assembly may have a first disk with a diameter of D1 and a second disk with a diameter of D2 which is greater than D1. The first disk and the second disk are concentrically disposed with each other and are coupled to each other such that as the first disk rotates, the second disk rotates. The input member is a rack that interfaces with the first disk of the gear assembly at one end and is coupled to the vibration source at the other end. The output member is a rack that interfaces with the second disk of the gear assembly at one end and is coupled to the first part of the transducer at the other end. The input member moves along an axis parallel with the central axis in response to the motion from the vibration source. The gear assembly rotates in response to the input member moving, the output member moves along an axis parallel with the central axis in response to the gear assembly rotating, and the first part of the transducer moves relative to the second part of the transducer along the central axis in response to the output member moving.

In an aspect of the present disclosure, for the amplifier which may have the gear assembly, the distance travelled by the first part of the transducer over the distance travelled by the input member in response to the vibration source is substantially proportional to D2/D1.

In an aspect of the present disclosure, the amplifier may include a gear assembly. The gear assembly may have a first disk with a diameter of D1 and a second disk with a diameter of D2 which is greater than D1. The first disk and the second disk are concentrically disposed with each other and are coupled to each other such that as the first disk rotates, the second disk rotates. The input member is a rack that interfaces with the first disk of the gear assembly at one end and is coupled to the vibration source at the other end. The output member is coupled to a surface of the second disk at one end and is coupled to the first part of the transducer at the other end. The input member moves along an axis parallel with the central axis in response to the motion from the vibration source, the gear assembly rotates in response to the input member moving, the output member moves in a piston like motion as the gear assembly rotates such that the other end of the output member coupled to the first part transducer moves along an axis parallel with the central axis.

In an aspect of the present disclosure, the transducer may include a magnet and a coil. The magnet and the coil move relative to each other.

In another aspect of the present disclosure, an energy harvester can be coupled to a vibration source, and include a housing, a transducer, and an amplifier. The transducer may generate an electrical signal, and reside in the housing. The transducer may have a first part and a second part. The first part and the second part are configured to move relative to each other along a central axis in response to a motion from the vibration source to generate the electrical signal. The amplifier may be coupled to the housing and operable to amplify an amplitude of the motion received from the vibration source. The amplifier may include a gear assembly, an input member, and an output member. The gear assembly has a first disk with a diameter D1 and a second disk with a diameter D2 which is greater than D1. The first disk and the second disk are concentrically positioned with each other. The input member interfaces with the first disk of the gear assembly at one end and is coupled to the vibrational source at the other end. The output member interfaces with the second disk of the gear assembly at one end and is coupled to the first part of the transducer at the other end. The input member moves along an axis parallel with the central axis in response to the motion from the vibration source, the gear assembly rotates in response to the input member moving, and the output member moves along an axis parallel with the central axis in response to the gear assembly rotating. The first part of the transducer moves relative to the second part of the transducer along the central axis in response to the output member moving such that a distance travelled by the first part of the transducer is greater than a distance the travelled by the input member in response to the vibration source.

In an aspect of the present disclosure, one end of the output member of the amplifier is coupled to a surface of the second disk. The output member moves in a piston like motion as the second disk of the gear assembly rotates in response to the input member moving such that the other end of the output member coupled to the first part transducer moves along the axis parallel with the central axis.

In an aspect of the present disclosure, the first disk and the second disk of the gear assembly have teeth. The input member is a rack that engages with the teeth of the first disk of the gear assembly, and the output member is a rack that engages with the teeth of the second disk of the gear assembly.

In an aspect of the present disclosure, the distance travelled by the first part of the transducer over the distance the travelled by the input member in response to the vibration source is substantially proportional to D2/D1.

In another aspect of the present disclosure, an energy harvester can be coupled to a vibration source, and include a housing, a transducer, and an amplifier. The transducer may generate an electrical signal, and reside in the housing. The transducer may have a first part and a second part. The first part and the second part are configured to move relative to each other along a central axis in response to a motion from the vibration source to generate the electrical signal. The amplifier may be coupled to the housing and is operable to amplify an amplitude of the motion received from the vibration source. The amplifier may include an input member, an output member, a frame, and a link. The input member may be coupled to the vibration source, and the output member may be coupled to the first part of the transducer. The frame may be coupled to the housing, and one end of the link may be coupled to the frame. The link may be configured to move in a predefined motion. The input member is coupled to the link at a position P1 and the output member is coupled to the link at a position P2 different from P1. The input member moves at a distance D1 in response to the motion from the vibration source, the lever moves in the predefined motion in response to the input member moving, and the output member moves the first part of the transducer in response to the predefined motion of the lever. The first part of the transducer moves relative to the second part of the transducer along the central axis by a distance D2 which is greater than D1.

In an aspect of the present disclosure, the amplifier may include a plurality of the links and a plurality of joints. The plurality of joints may join two or more links from among the plurality of the links to form a linkage assembly that moves in the predefined motion in response to the motion from the vibration source. The input member is coupled at one end of the linkage assembly which is the position P1, and the output member is coupled at the other end of the linkage assembly which is the position P2. The position P1 and the position P2 align along an axis parallel with the central axis. The position P1 moves the distance D1 and the position P2 moves the distance D2 in response to the motion from vibration source.

In an aspect of the present disclosure, the frame of the amplifier includes an input slider coupled to the housing and an output slider coupled to the housing at a position different from the input slider. A first end of the linkage assembly slidingly moves along the input slider and a second end of the linkage assembly opposite the first end slidingly moves along the output slider. The first end is coupled to the input member and the second end is coupled to the output member.

In an aspect of the present disclosure, the amplifier may include a shaft that may be coupled to the frame and pivots about a central shaft axis. The link is coupled to the shaft and pivots with the shaft about the central shaft axis as the predefined motion. The input member is coupled at the position P1 of the link which is a first length L1 from the central shaft axis, and the output member is coupled at the position P2 of the link which is a second length L2 from the central shaft axis, and L2>L1. The distance D2 travelled by the first part of the transducer over the distance D1 travelled by the input member is substantially proportional to L2/L1.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 illustrates the gear-crank amplifier of FIG. 5 coupled to the vibration source and the transducer;

FIG. 7 illustrates a positional relationship between a gear, a pinion, and a crank of the gear-crank amplifier;

FIG. 19 is a perspective view of a four-bar linkage amplifier;

FIG. 20 illustrates a movement of the four-bar linkage amplifier of FIG. 19;

Corresponding reference numerals indicate corresponding parts throughout the several views of the drawings.

DETAILED DESCRIPTION

Figure 1:
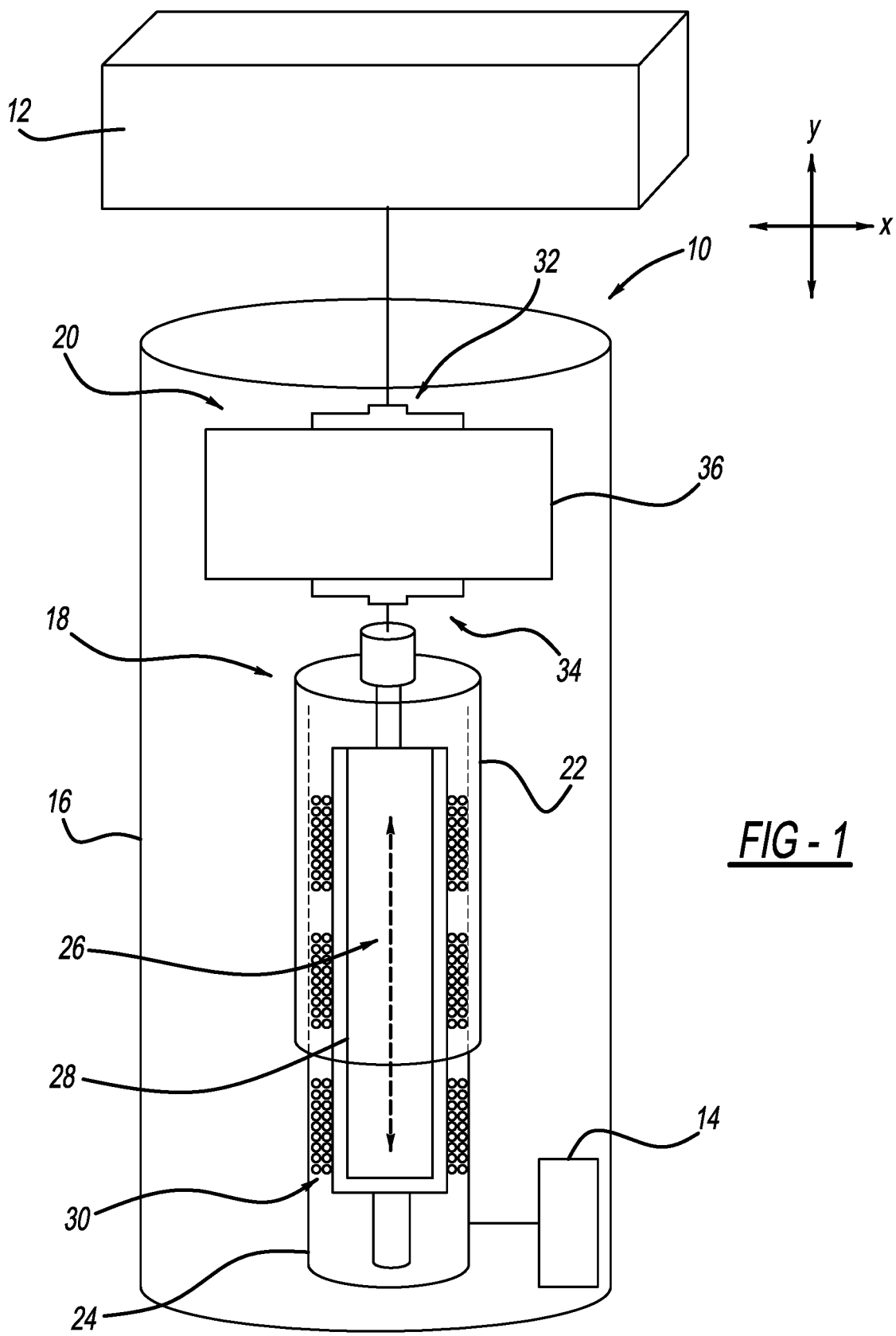
FIG. 1 illustrates a vibration source coupled to an energy harvester having transducer and an amplifier.

Example embodiments will now be described more fully with reference to the accompanying drawings. With reference to FIG. 1, an example of an energy harvester 10 is presented. The energy harvester 10 may transform environmental vibrational energy from a vibration source 12 to electrical energy. The electrical energy may be received and stored in an energy store 14 (e.g., battery, a supercapacitor, etc) and utilized to power an electronic device (not shown). Alternatively, the energy harvester 10 may perform as a sensor to monitor the conditions of a dynamic system via the electrical energy. In addition, the energy harvester 10 may not include the energy store 14, and may perform as an actuator by translating the electrical energy into a mechanical motion.

The energy harvester 10 includes a housing 16, a transducer 18, and an amplifier 20. The transducer 18 and the amplifier 20 reside within the housing 16. While the housing 16 is depicted as having a cylindrical shape, it is understood that the housing 16 may have another suitable shape, such as a cuboid, and is not limited to the cylindrical shape depicted.

The transducer 18 may include two parts which move relative to each other. For example, the transducer 18 may include a first part 22 and a second part 24 that are centered about a central axis 26. The first part 22 and the second part 24 slidingly move along the central axis 26 relative to each other. One part may be fixed to the housing 16 while the other part is movable. Alternatively, both parts may be detached from the housing 16 and move relative to each other.

The transducer 18 may be an electromagnetic transducer having a series of magnets 28 and coils 30. The magnets 28 and the coils 30 may be disposed within the second part 24 which is disposed within the first part 22. The magnets 28 may be coupled to the first part 22 while the coils are coupled to the second part 24. Accordingly, by way of the first part 22 and the second part 24, the magnets 28 and the coils 30 move relative to each other along the central axis 26. The magnets 28 and the coils 30 move relative to each other in response to kinetic energy from the vibration source 12. The relative movement causes a variation in the electromagnetic field, thereby generating electrical potential across the coil 30 and the electrical signal. An example of an electromagnetic transducer is more fully described in U.S. Pat. No. 10,734,877 B2 titled "ELECTROMAGNETIC ENERGY TRANSDUCER", the disclosure of which is hereby incorporated by reference in its entirety.

The transducer 18 can also be a piezoelectric transducer or other suitable transducers. More particularly, the energy harvester 10 can include a transducer that generates energy based on, for example, piezoelectric, electrostatic, magnetostrictive, and/or electrostrictive actuation. Thus the energy harvester 10 is not limited to an electromagnetic transducer.

The amplifier 20 is attached to the housing 16, and includes an input member 32, an output member 34, and a transmission member 36. The input member 32 is coupled to the vibration source 12 and the output member 34 is coupled to the transducer 18. Specifically, the output member 34 is coupled to a movable part of the transducer 18, such as the first part 22. In the example embodiments described herein, the amplifier 20 is described as being directly coupled to the housing 16. Alternatively, the amplifier 20 may be coupled to the housing 16 via a part of the transducer that is fixed to the housing 16. For example, if the second part 24 is fixed to the housing 16, the amplifier 20 may be attached to the second part 24, thereby being coupled to the housing 16 via the second part 24.

The amplifier 20 receives a motion from the vibration source 12 via the input member 32. More particularly, a motion generated by the vibration source 12 may move the input member 32 in a direction parallel with the central axis 26. The transmission member 36 increases the amplitude of the motion received and transmits an amplified motion to the transducer 18 via the output member 34. Specifically, the transmission member 36 increases the motion, such that the transducer 18, in response to the output member 34, moves a distance greater than the distance travelled by the input member 32 in response to the vibration source 12. When the transducer 18 operates as an actuator, the amplifier 20 receives a motion from the transducer 18 via the output member 34. After amplification, the amplifier transmits the motion to an external system via the input member 32. The amplifier may amplify the displacement of the motion or the force of the motion.

While the amplifier 20 is described in relation to an electromagnetic transducer, other types of transducers may receive the amplified motion of the vibration source 12. For example, if the transducer 18 is a piezoelectric transducer, one side of the structure can be fixed to the housing 16 and the other can be attached to the amplifier 20. By increasing the amplitude of the motion, the amount of strain imposed on the piezoelectric material is increased. For an electrostatic transducer, by increasing the amplitude of the motion, a gap between electrodes or an overlapped area of an electrode surface is modified to increase the capacitance outputted. Thus, the amplifier 20 can be utilized for various suitable transducers that have at least one moving part.

The amplifier 20 primarily includes a mechanical configuration for increasing the amplitude of the motion from the vibration source 12. For example, the amplifier 20 may include a gear configuration, a lever configuration, a linkage configuration, or a hydraulic configuration as described herein. Each configuration includes the input member 32 for receiving the motion from the vibration source 12, the transmission member 36 for increasing the amplitude of the motion received, and the output member 34 for transmitting the amplified movement to the transducer 18. Movement of the various components of the energy harvester 10 and the vibration source 12 may be described with reference to a coordinate system having three orthogonal axis (x, y, z), where the central axis 26 is parallel with the y-axis.

Figure 2:
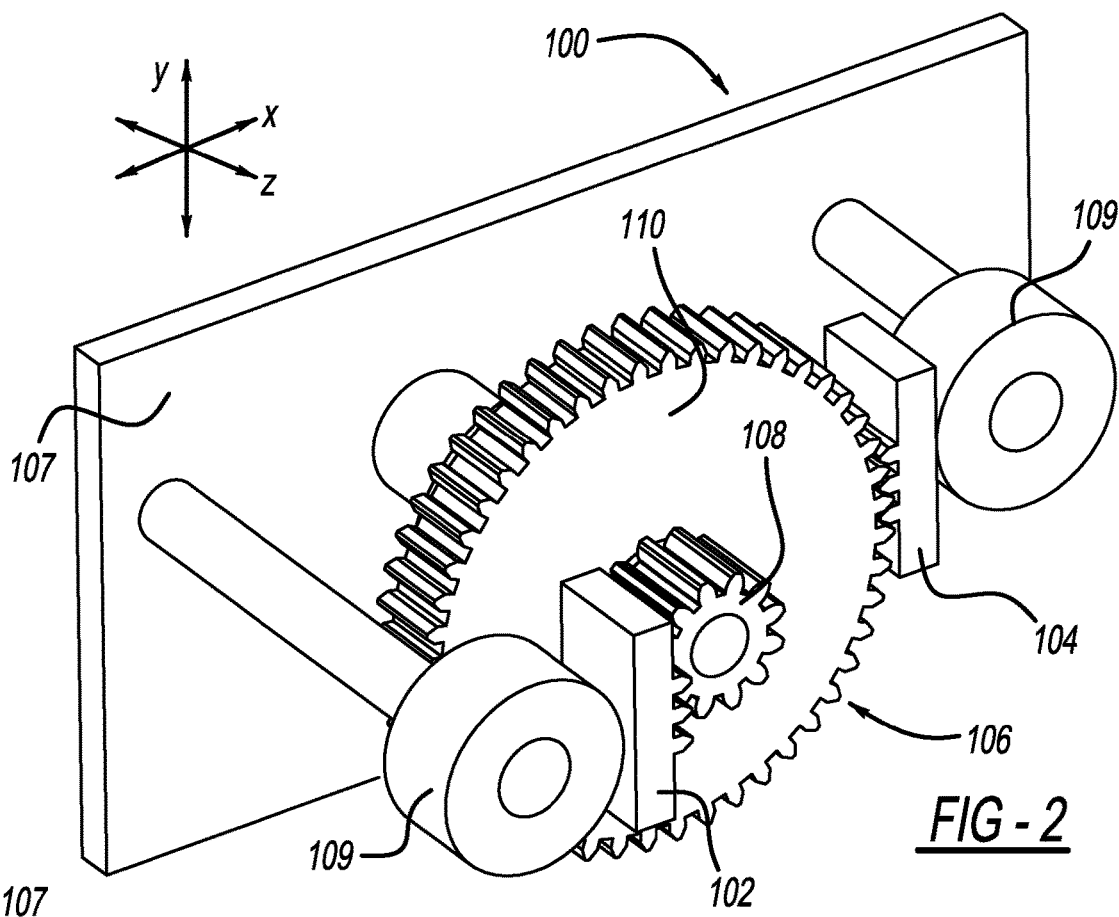
FIG. 2 is a perspective view of a concentric gear amplifier.
Figure 3:
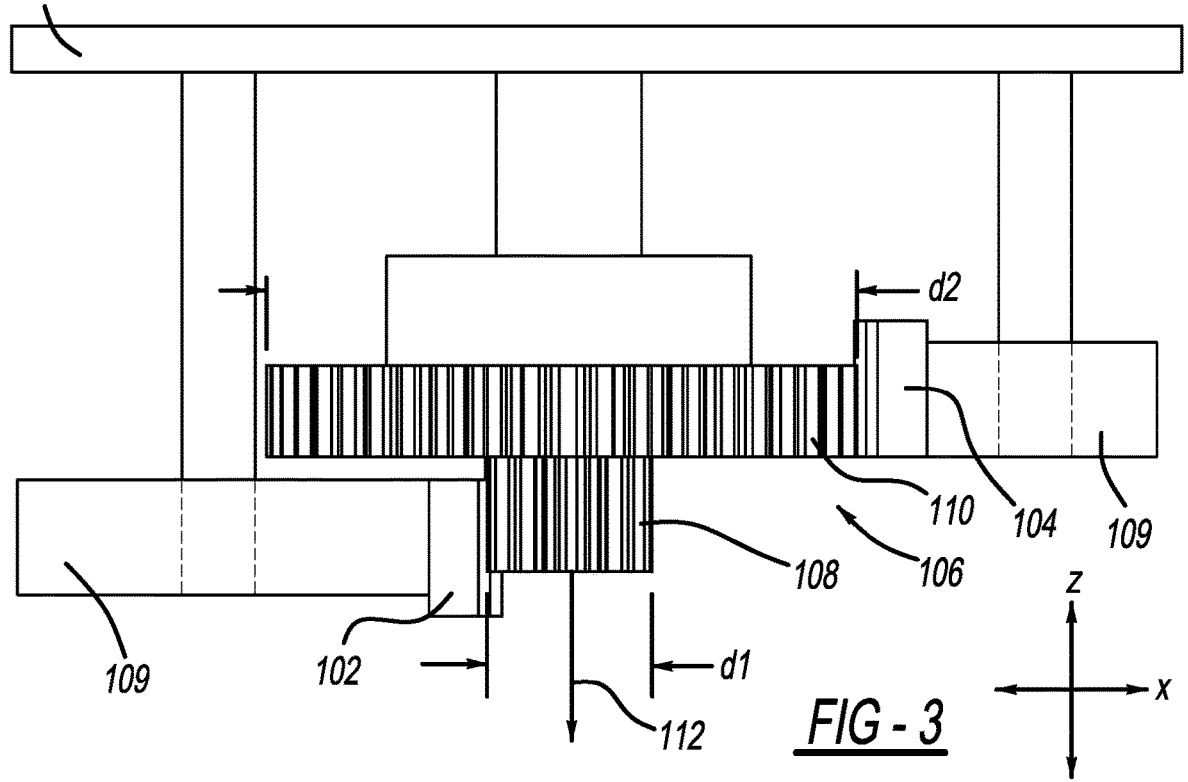
FIG. 3 is a top view of the concentric gear amplifier of FIG. 2.
Figure 4:
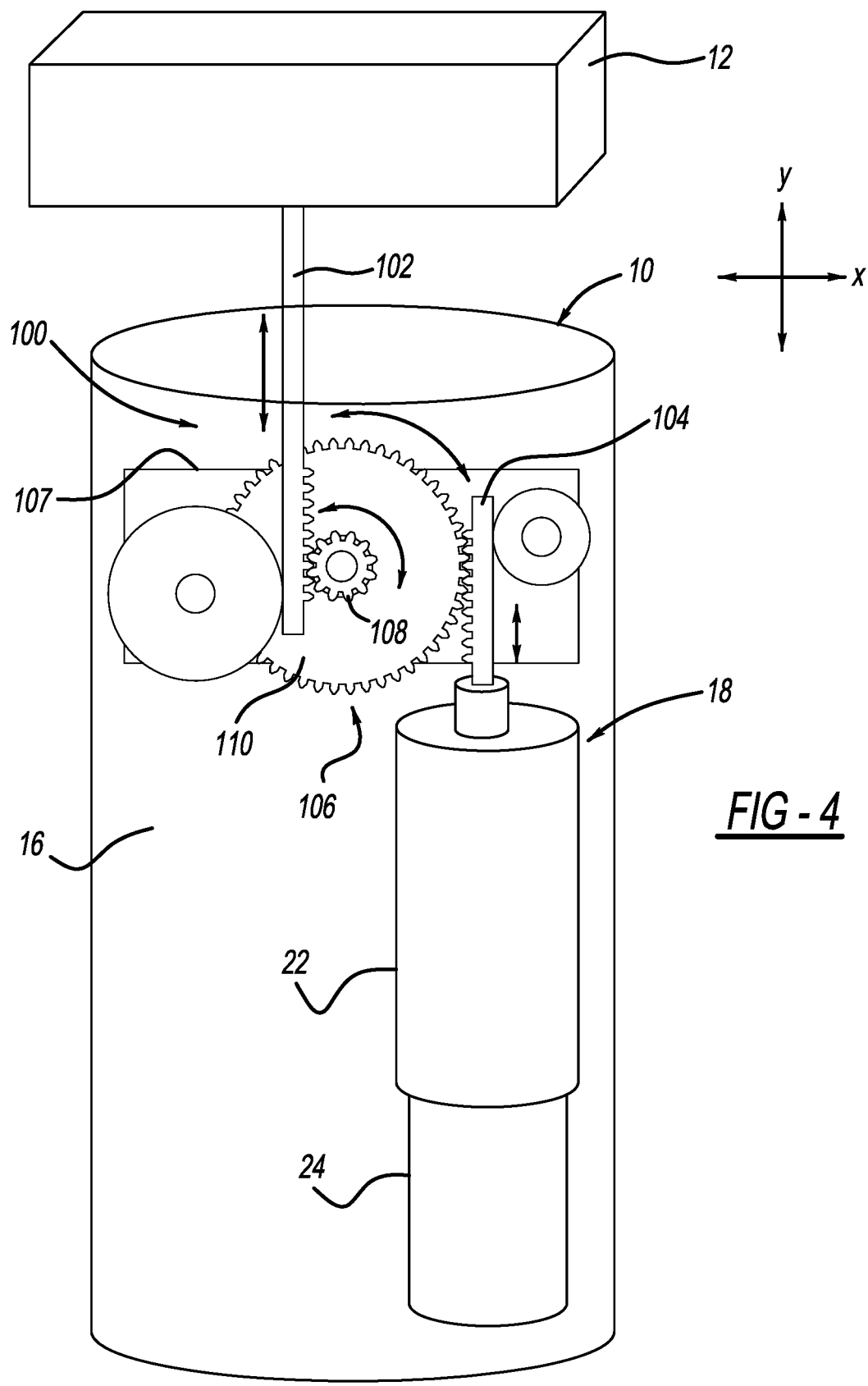
FIG. 4 illustrates the concentric gear amplifier of FIG. 2 coupled to the vibration source and the transducer.

FIGS. 2-4 depict an example embodiment of a concentric gear amplifier 100 which can be used as the amplifier 20 in the energy harvester 10. The concentric gear amplifier 100 includes an input rack 102, an output rack 104, and a gear assembly 106. The concentric gear amplifier 100 is attached to the housing 16 via a frame 107. The frame 107 may be attached to the housing 16 using various suitable methods, such as screws, bolts, welding, adhesive, etc. For purposes of clarity, portions of the input rack 102 and the output rack 104 are cut-off in FIGS. 2 and 3.

As the input member 32, the input rack 102 is coupled to the vibration source 12 at one end and interfaces with the gear assembly 106 at the other end. As the output member 34, the output rack 104 interfaces with the gear assembly 106 at one end and couples to the transducer 18 at the other end. More particularly, the output rack 104 is coupled to the first part 22 (i.e., movable part) of the transducer 18. The input rack 102 and the output rack 104 have a bar shape body and include a series of teeth on one side which engage with the gear assembly 106. The other side of the input rack 102 and the output rack 104 may be supported by a bearing 109. The input rack 102 and the output rack 104 travel along a y-axis which is parallel with the central axis 26.

As the transmission member 36, the gear assembly 106 includes a driving gear 108 and a driven gear 110. The driving gear 108 has a diameter d1 and the driven gear 110 has a diameter d2 which is greater than the diameter d1 (d2>d1). The driving gear 108 and the driven gear 110 are concentrically disposed with each other. The driving gear 108 may be disposed on a surface of the driven gear 110, such that the center point of the driving gear 108 and the driven gear 110 overlap with each other. The driving gear 108 and the driven gear 110 rotate about a rotational axis 112 which is parallel with the z-axis and perpendicular to the central axis 26. The driving gear 108 and the driven gear 110 are coupled with each other such that as the driving gear 108 rotates, the driven gear 110 also rotates.

The input rack 102 and the driving gear 108 forms a rack and pinion arrangement in which an axial movement of the input track 102 along the y-axis is converted to a rotational movement about the z-axis. Similarly, the driven gear 110 and the output rack 104 form a rack and pinion arrangement in which the rotational movement of the driven gear 110 about the z-axis is converted to an axial movement of the rack 104 along the y-axis.

In operation, the energy harvester 10 having the concentric gear amplifier 100 as the amplifier 20 receives a motion from the vibration source 12 which moves the transducer 18. Specifically, as indicated by the arrows in FIG. 4, the motion from the vibration source 12 moves the input rack 102, such that the input rack 102 travels along the y-axis. In response to the axial movement of the input rack 102, the driving gear 108 and the driven gear 110 rotate about the z-axis. The driven gear 110, which has a larger diameter than the driving gear 108, moves the output rack 104 along the y-axis. The output rack 104 further moves the first part 22 of the transducer 18, such that the first part 22 moves relative to the second part 24 along the central axis 26 which is parallel with the y-axis.

The concentric gear amplifier 100 increases the motion of the vibration source 12 by a gain G which is substantially equal to the diameter of the driven gear 110 over the diameter of the driving gear 108 (G≈d2/d1). While the angular velocity of the driving gear 108 and the driven gear 110 is the same, a linear velocity along the y-axis of the driving gear 108 and the driven gear 110 is different. The driving gear 108 has a smaller diameter than the driven gear 110. Accordingly, the driven gear 110 travels a greater distance than the driving gear 108 during the same rotational movement by an amount substantially equal to d2/d1.

The number of teeth on the input rack 102 and the output rack 104 can be adjusted based on a maximum allowed displacement of the transducer 18. For example, the input rack 102 and the output rack 104 can be configured to have enough teeth to move the transducer 18 to the maximum displacement. Accordingly, once the transducer 18 has reached the maximum displacement, the driving gear 108 would be engaged with a portion of the input rack 102 that does not include teeth. Thus, preventing the driving gear 108 and the driven gear 110 from rotating and further preventing displacement of the output rack 104 and the transducer 18. However, in configurations where other forces, such as gravitational or centrifugal forces are applied in the y-axis, the input rack 102, the gear assembly 106, and/or the output rack 104 may move freely, thereby introducing an off-set relative to their initial position. Such displacement may cause misalignment of the moving parts 22, 24 and the components within the moving parts 22, 24 (e.g., magnets, coils).

Figure 5:
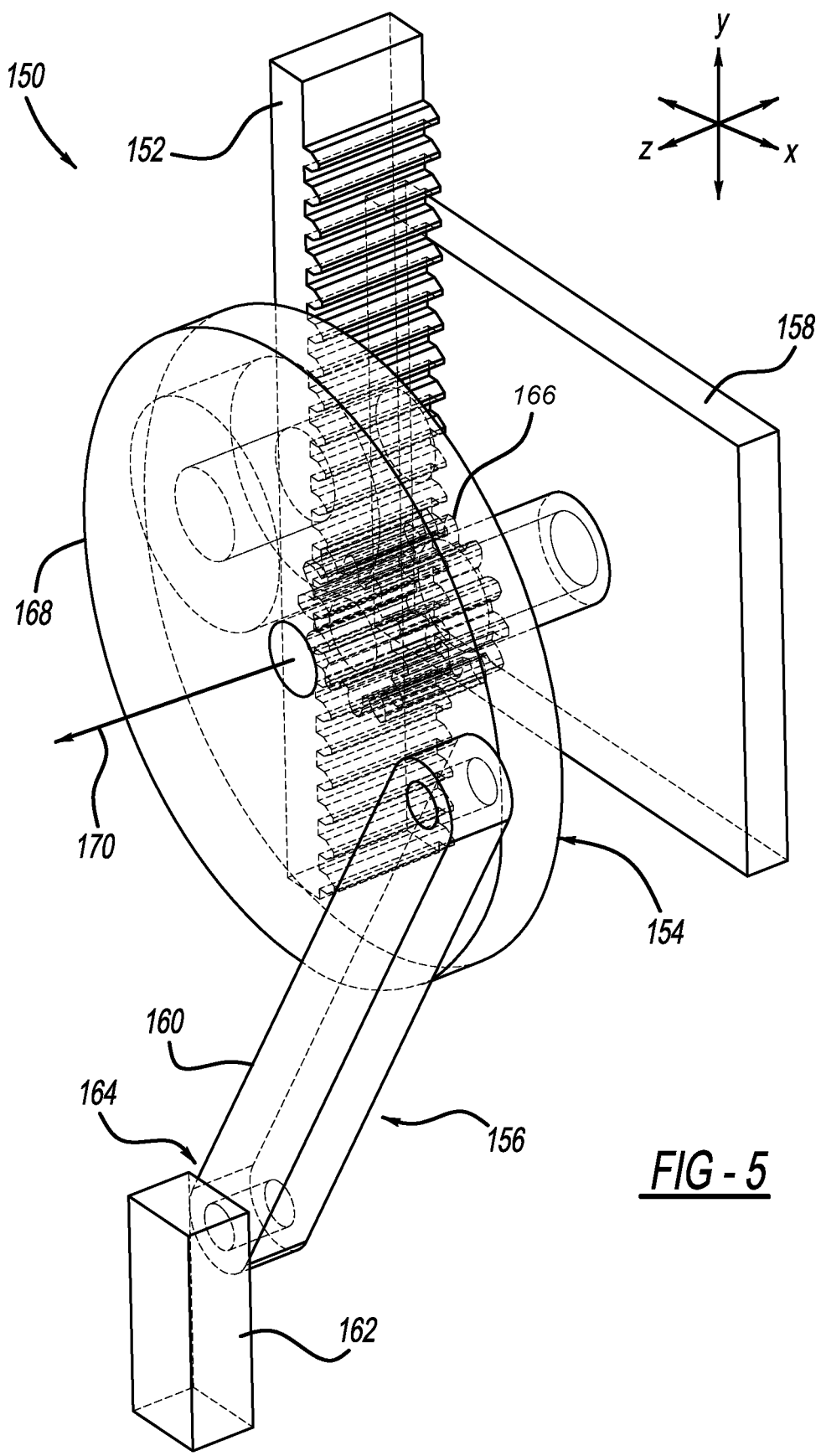
FIG. 5 is a perspective view of a gear-crank amplifier.

To overcome such high displacements, in lieu of the concentric gear amplifier 100, the energy harvester 10 may include a gear-crank amplifier 150. For example, FIGS. 5-7 depict an example embodiment of the gear-crank amplifier 150 which can be used as the amplifier 20 in the energy harvester 10. The gear-crank amplifier 150 includes an input rack 152, a gear-disk assembly 154, and a crank 156. The gear-crank amplifier 150 is attached to the housing 16 via a frame 158. For purposes of clarity, portions of the input rack 152 and the crank 156 are cut-off in FIG. 5.

As the input member 32, the input rack 152 is coupled to the vibration source 12 at one end and interface the gear-disk assembly 154 at the other end. As the output member 34, the crank 156 is coupled to the gear-disk assembly 154 at one end and the transducer 18 at the other end. More particularly, the crank 156 includes a link 160 and a handle 162. The link 160 is fixedly coupled to the gear-disk assembly 154 at one end and pivotably coupled to the handle 162 at the other end. The handle 162 is coupled to the first part 22 of the transducer 18 at an end opposite of the link 160. The link 160 and the handle 162 form a joint 164. The link 160 rotates about the joint 164 while the handle 162 retains a fixed position. More particularly, the link 160 rotates about the joint 164 such that the handle 162 travels along a travel path parallel with the y-axis. To properly align the handle 162 along the y-axis, the gear-crank amplifier 150 may include a sleeve bearing or the like that is fixedly attached to the frame 158 and defines a hole parallel with the y-axis. The handle 162 can travel within the sleeve bearing which aligns the handle 162 with its travel path.

As the transmission member 36, the gear-disk assembly 154 includes a pinion 166 and a disk 168. The diameter of the pinion 166 is smaller than the diameter of the disk 168. The pinion 166 and the disk 168 are concentrically disposed with each other. The pinion 166 and the disk 168 rotate about a rotational axis 170 which is parallel with the z-axis. The pinion 166 and the disk 168 are coupled with each other such that as the pinion 166 rotates, the disk 168 rotates.

The teeth of the input rack 152 engage with the teeth of the pinion 166. Accordingly, as the input rack 152 travels along the y-axis, the pinion 166 converts an axial movement of the input rack 152 to a rotational movement about the z-axis, as indicated by the arrows in FIG. 6. The crank 156 is arranged substantially at an outer diameter of the disk 168. As the pinion 166 rotates, the disk 168 rotates and the crank 156 moves in a manner similar to a piston moving in an internal combustion engine. Specifically, as the crank 156 rotates with the disk 168, the link 160 pivots about the joint 164, such that the joint 164 and the handle 162 move axially along the y-axis. Thus, the rotational movement of the disk 168 is converted to an axial movement along the y-axis as indicated by the arrows 169, 171 in FIG. 6. Arrow 169 illustrates the axial movement along the y-axis of the input rack 152 in response to the rotational movement of the disk 168. Arrow 171 illustrates the slidingly movement of the first part 22 and the second part 24 along the central axis 26 relative to each other in response to the rotational movement of the disk 168.

With reference to FIG. 7, the gear-crank amplifier 150 provides a gain G that can be calculated by Equation 1 which can be further simplified to Equation 2, where R is the radius of the disk 168, r is the radius of the pinion 166, L is the length of the link 160, x is the distance from a center C to the joint 164, ω is the angular velocity, n is ratio of L/R, θ is the angle between x and R, d1 is the diameter of the of the pinion 166 (d1=2r), and d2 is the diameter of the disk 168 (d2=2R).

$$G = R/r \left( \sin\theta + \frac{\sin 2\theta}{2\sqrt{n^2 - \sin^2\theta}} \right) \quad \text{Equation 1}$$

$$G = \frac{d_2}{d_1} \left( \sin\theta + \frac{\sin 2\theta}{2 \times \sqrt{\left(\frac{2L}{d_2}\right)^2 - \sin^2\theta}} \right) \quad \text{Equation 2}$$

To maximize the gain G, the optimum value of angle θ should be between 45° to 90° regardless of the value of n. If seeking a complete rotation cycle for the disk 168, it is preferred to set n substantially equal to or greater than "1". Accordingly, the radius R of the disk 168 should be increased as much as possible but at the same time be balanced with the stroke range of the amplifier 150 and with the space designated within the housing 16, and the radius r of the pinion is set as small as possible.

In operation, the energy harvester 10 having the gear-crank amplifier 150 as the amplifier 20 receives a motion from the vibration source 12 which moves the transducer 18. Specifically, as indicated by the arrows in FIG. 6, the motion from the vibration source 12 moves the input rack 152, such that the input rack 152 travels along the y-axis. In response to the movement of the input rack 152, the pinion 166 and the disk 168 rotate about the z-axis. The disk 168, which has a larger diameter than the pinion 166 moves the crank 156, which moves in a piston like motion with the disk 168. The crank 156 moves the first part 22 of the transducer 18 along the central axis 26 which is parallel with the y-axis.

The gear-crank amplifier 150 regulates the movement of the transducer 18 such that the transducer 18 does not move beyond its maximum displacement. Once the transducer 18 is properly aligned, the gear-crank amplifier 150 moves the transducer 18 within a predetermined range to ensure no misalignment of the components within the transducer 18. Furthermore, the gear-crank amplifier 150 accommodates both static loads and dynamic displacements regardless of their amplitudes.

Figure 8:
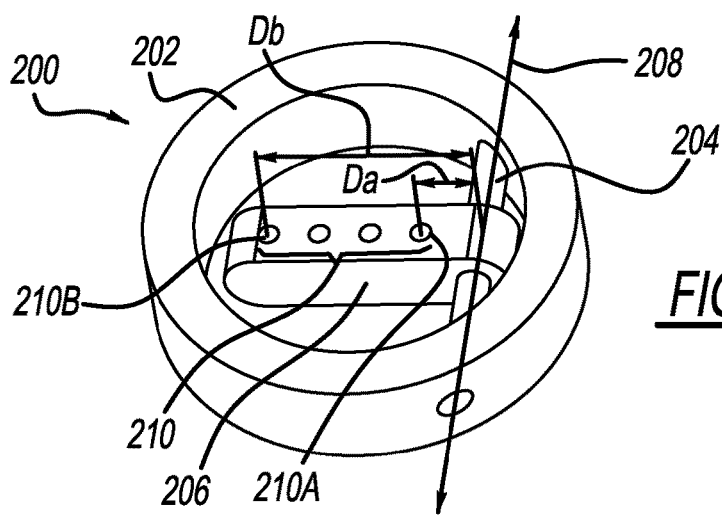
FIG. 8 is a perspective view of a symmetrical lever amplifier.
Figures 9A, 9B:
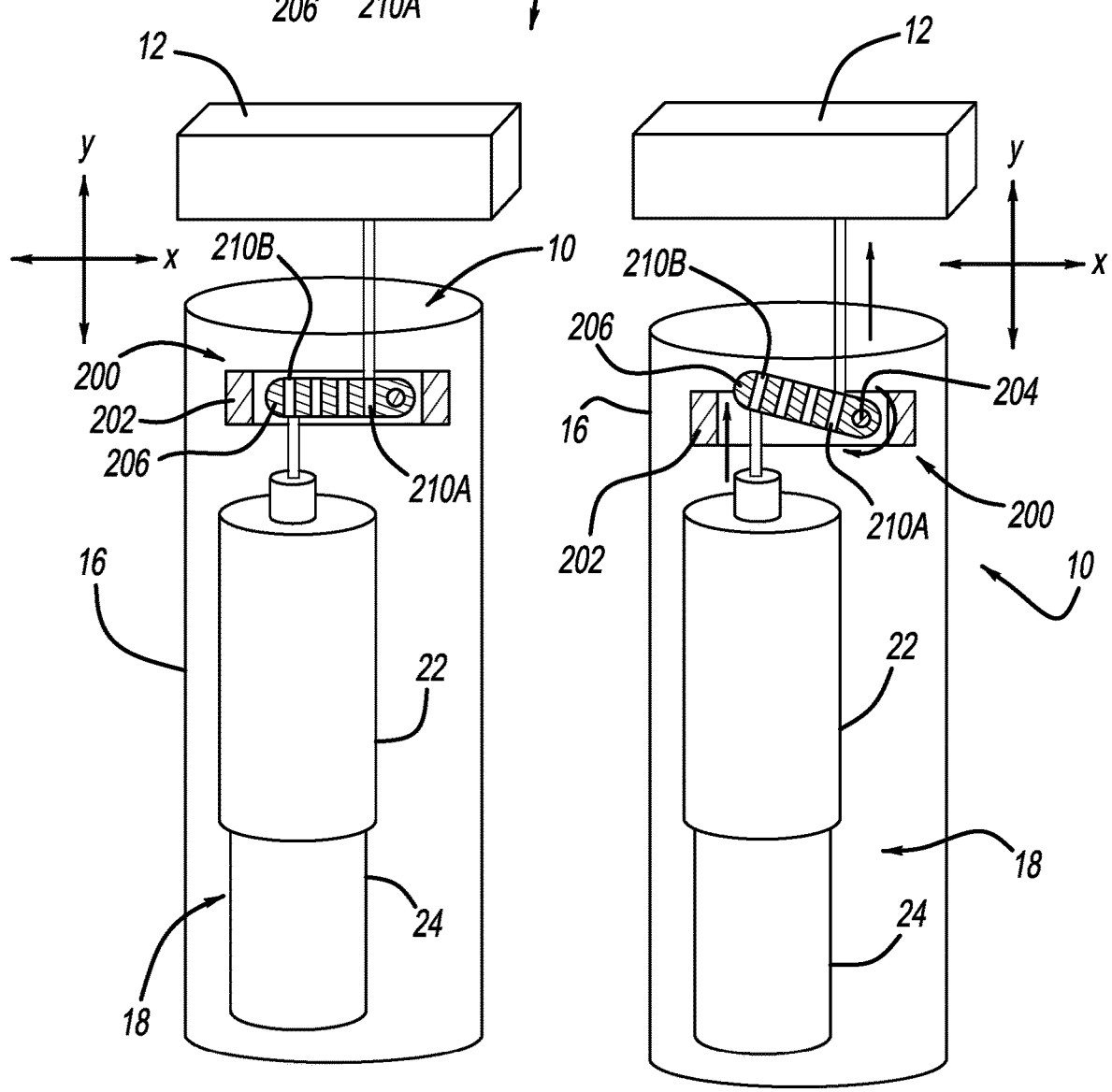
FIGS. 9A and 9B illustrates the symmetrical lever amplifier of FIG. 8 coupled to the vibration source and the transducer.

The concentric gear amplifier 100 and the gear-crank amplifier 150 require several components which may lead to a complex and potentially expensive amplifier. In lieu of a gear based amplifier, the amplifier 20 may be a lever based amplifier. For example, FIGS. 8-9B depict an example embodiment of a symmetrical lever amplifier 200 which can be used as the amplifier 20 in the energy harvester 10. The symmetrical lever amplifier 200 includes a frame 202, a shaft 204, and a lever 206. The frame 202 is attached to the housing 16.

One end of the lever 206 is attached to the shaft 204. The lever 206 may define one or more holes 210. As the input member 32, a hole 210A is coupled to the vibration source 12. As the output member 34, a hole 210B is coupled to the transducer 18. The holes 210A and 210B can be coupled to the vibration source 12 and the transducer 18, respectively, by way of a wire or other suitable fastening methods. The distance between the hole 210A and a central shaft axis 208 is Da, and the distance between the hole 210B and the central shaft axis 208 is Db which is greater than Da (Db>Da). Thus, the vibration source 12 is coupled to a point along the lever 206 which is closer to the central shaft axis 208 than the transducer 18.

As the transmission member 36, the shaft 204 extends from one end of the frame to the other end, and pivots about the central shaft axis 208. The shaft 204 is symmetrical along the central shaft axis 208. For a lever based amplifier, the amount of force applied to a component due to the movement of the shaft 204 is based on the distance of the component from the central shaft axis 208. Specifically, as the component moves farther from the central shaft axis 208, the component will experience more movement. Thus, when the shaft 204 pivots, the portion of the lever 206 that has the hole 210B may move more than the portion of the lever 206 that has the hole 210A.

In operation, the energy harvester 10 having the symmetrical level amplifier 200 as the amplifier 20 receives a motion from the vibration source 12 which moves the transducer 18. Specifically, as shown in FIGS. 9A-9B, the motion from the vibration source 12 exerts a movement of the lever 206 at hole 210A. In response to the motion, the shaft 204 pivots about the central shaft axis 208, thereby causing the lever 206 to lift. Accordingly, the hole 210B is displaced and moves the first part 22 of the transducer 18 along the central axis 26 which is parallel with the y-axis.

While the movement shown in FIG. 9B lifts the lever 206 in a direction away from the transducer 18, the lever 206 may pivot in a downward direction toward the transducer 18 based on the direction of the motion from the vibration source 12. In FIGS. 9A-9B a partial cross-sectional view of the symmetrical level amplifier 200 is shown to clearly show the lever 206 and the shaft 204.

The distance travelled by the lever 206 at the hole 210A in response to the motion from the vibration source 12 is less than the distance travelled by the lever 206 at hole 210B. Specifically, the symmetrical level amplifier 200 provides a gain G substantially equal to the distance between the hole 210B and the central shaft axis 208 over the distance between the hole 210A and the central shaft axis 208 (G≈Db/Da).

Figure 10:
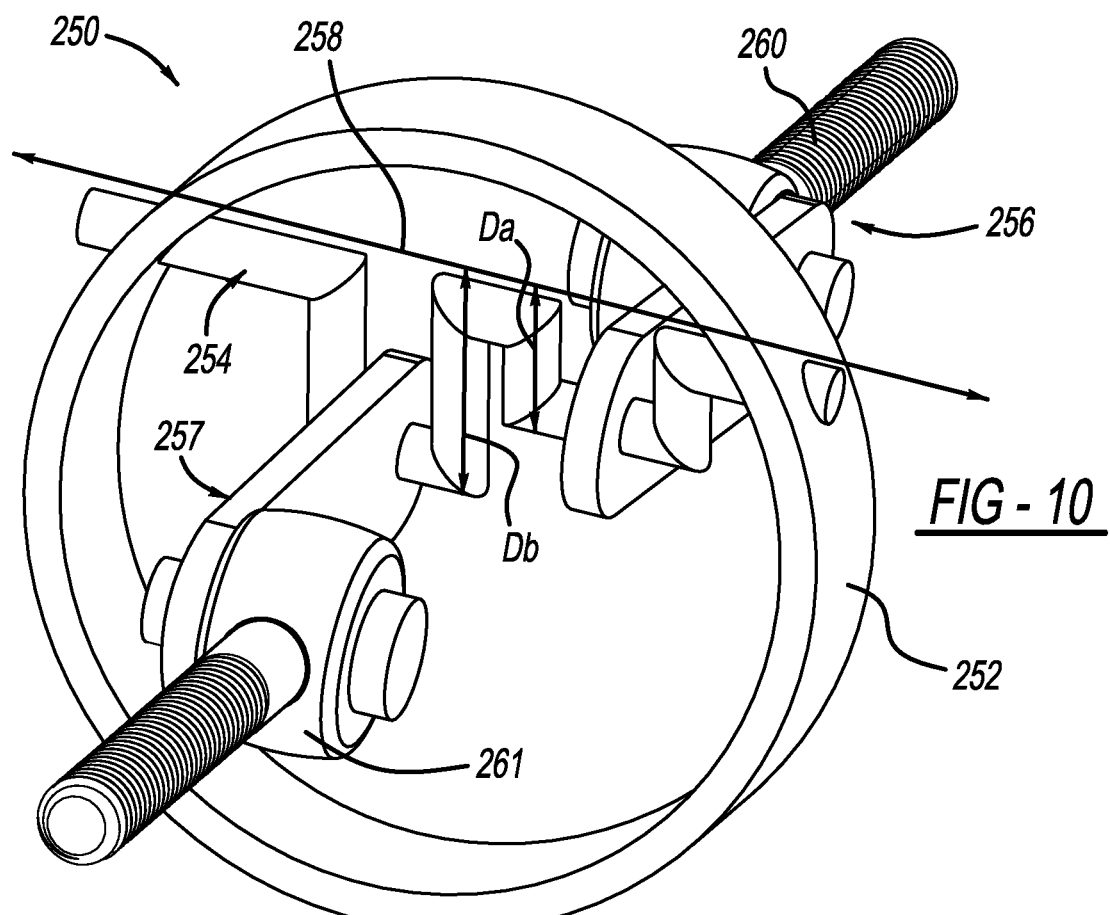
FIG. 10 is a perspective view of an asymmetrical lever amplifier.
Figure 11:
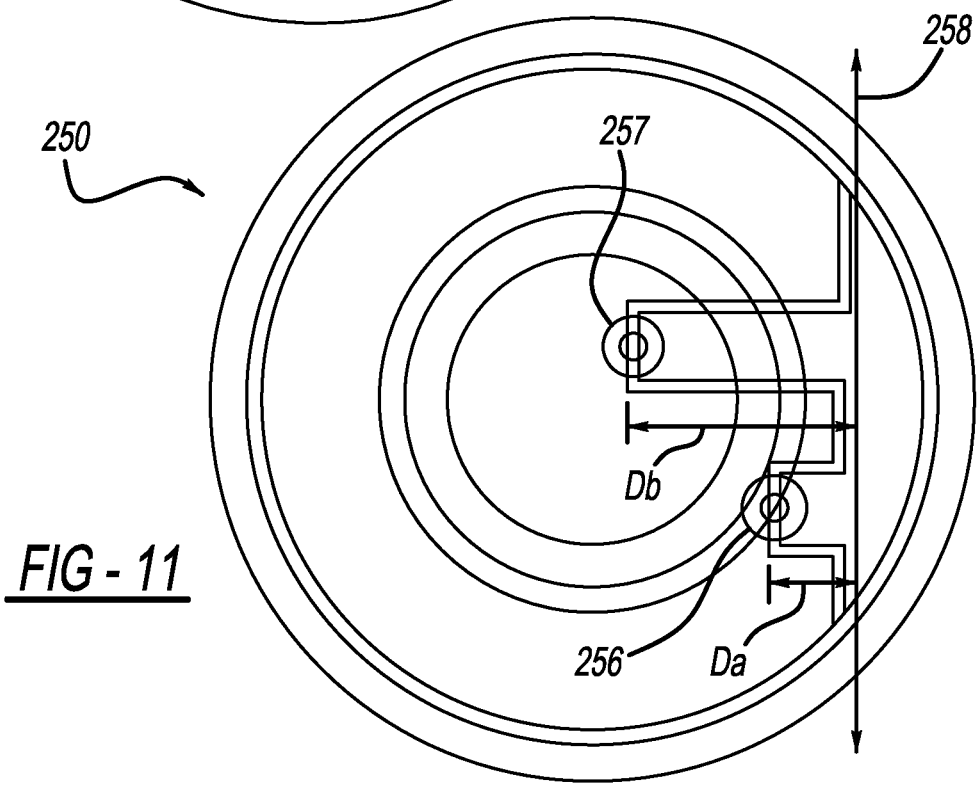
FIG. 11 illustrates an alignment of a shaft of the asymmetrical lever amplifier with respect to the transducer and the vibration source.
Figure 12:
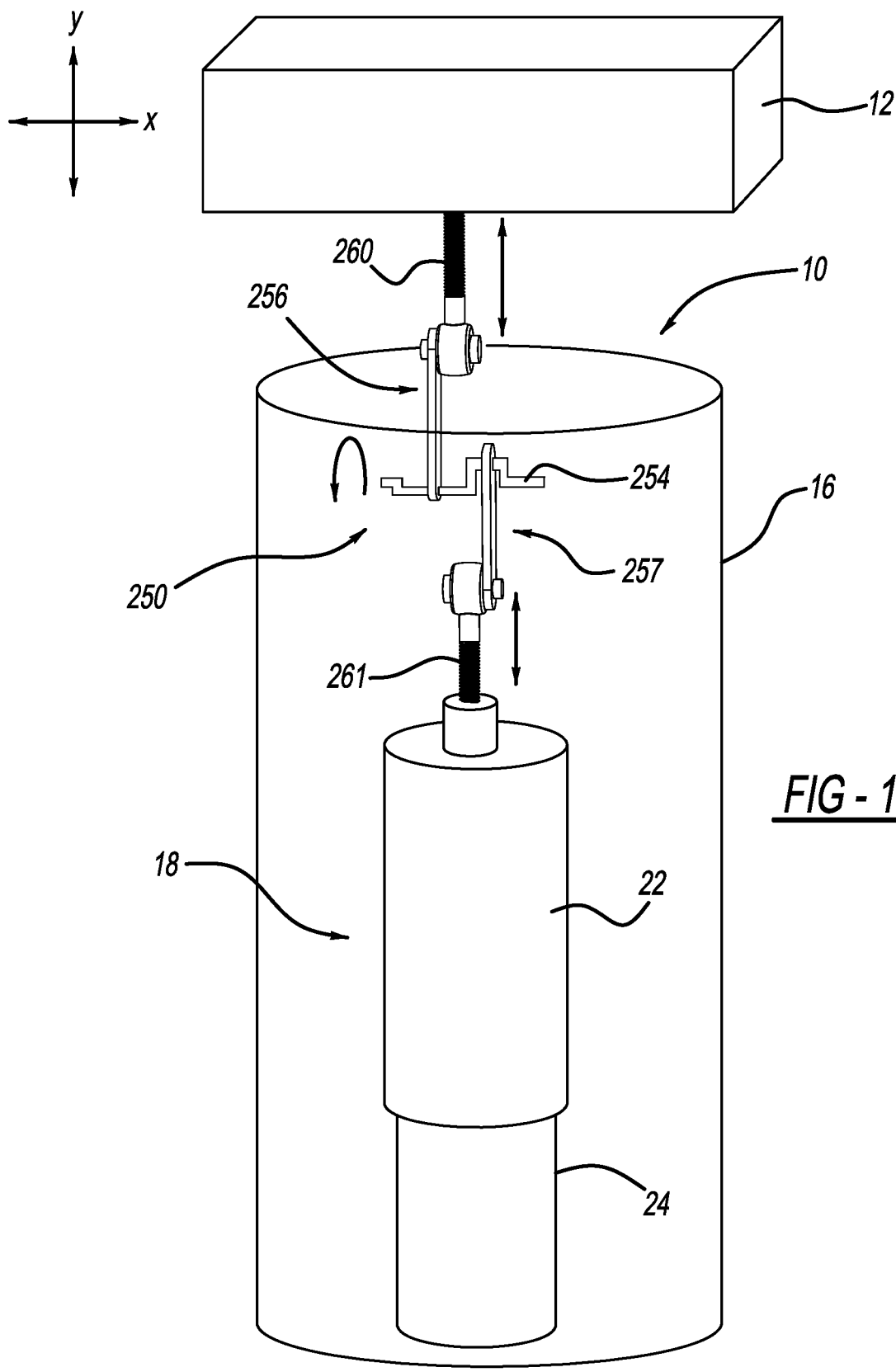
FIG. 12 illustrates the asymmetrical lever amplifier of FIG. 10 coupled to the vibration source and the transducer.

FIGS. 10-12 depict an example embodiment of an asymmetrical lever amplifier 250 which can be used as the amplifier 20 in the energy harvester 10. The asymmetrical lever amplifier 250 includes a frame 252, an input link 256, an output link 257, and a shaft 254. The frame 252 is attached to the housing 16.

As the input member 32, the input link 256 is coupled to the vibration source 12 at one end and the shaft 254 at the other end. Specifically, the input link 256 may include an arm 260 which couples to the vibration source 12. As the output member 34, the output link 257 is coupled to the shaft 254 at one end and the transducer 18 at the other end. More particularly, the output link 257 may include an arm 261 which couples to the first part 22 of the transducer 18.

As the transmission member 36, the shaft 254 extends from one end of the frame 252 to the other end, and pivots above a central shaft axis 258. The shaft 254 is an asymmetrical shaft having a zigzag shape. The input link 256 is coupled to the shaft 254 at a distance Da from the central shaft axis 258. The output link 257 is coupled to the shaft 254 at a distance Db from the central shaft axis 258 Db which greater than Da (Db>Da). Thus, the vibration source 12 is coupled to the shaft 254 at a point closer to the central shaft axis 258 than the transducer 18.

In operation, the energy harvester 10 having the asymmetrical lever amplifier 250 as the amplifier 20 receives a motion from the vibration source 12 which moves the transducer 18. Specifically, as indicated by the arrows shown in FIG. 12, the motion from the vibration source 12 exerts a movement upon the input link 256. In response to the motion, the shaft 254 pivots about the central shaft axis 258, thereby moving the output link 257. Accordingly, the link 256B is displaced and moves the first part 22 of the transducer 18 along the central axis 26 which is parallel with the y-axis. In FIG. 12, the frame 252 is omitted to clearly show the shaft 254.

Similar to the symmetrical level amplifier 200, the asymmetrical lever amplifier 250 has a gain substantially equal to the distance between the output link 257 and the central shaft axis 258 over the distance between the input link 256 and the central shaft axis 258 (G≈Db/Da). Accordingly, the distance travelled by the input link 256 in response to the motion from the vibration source 12 is less than the distance travelled by the transducer 18 in response to the output link 257.

The symmetrical level amplifier 200 and the asymmetrical lever amplifier 250 have relatively simple and compact structure with the least number of components in comparison to the concentric gear amplifier 100 and the gear-crank amplifier 150, thereby further minimizing frictional and mechanical loss. However, the amplifier 200 and 250 accommodate a limited amount of displacement, whereas the concentric gear amplifier 100 and the gear-crank amplifier 150 are capable to operate under substantially unlimited amount of input displacement. To achieve the maximum amplification, it is preferred to have the lever or the asymmetric shaft perpendicular to the vibration axis (e.g. the y-axis).

The amplifier 20 may be a linkage based amplifier. A linkage amplifier includes a plurality of links which are configured to move in a predefined movement. The linkage amplifier receives a motion from the vibration source 12 and transfers an amplified motion via the predefined movement to the transducer 18. The gain of the linkage amplifier is based on many factors, such as the number of links, the length of the links, and the predefined movement.

Figure 13:
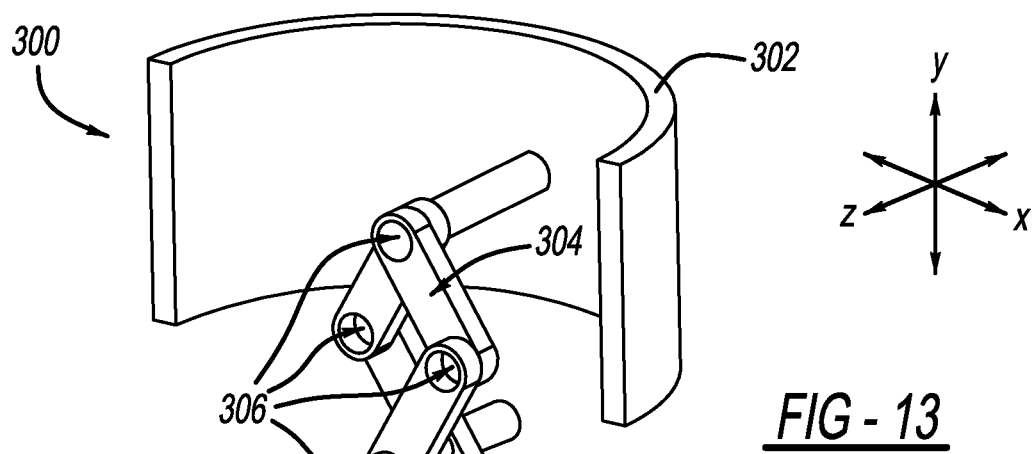
FIG. 13 is a perspective view of a scissor linkage amplifier.
Figure 14:
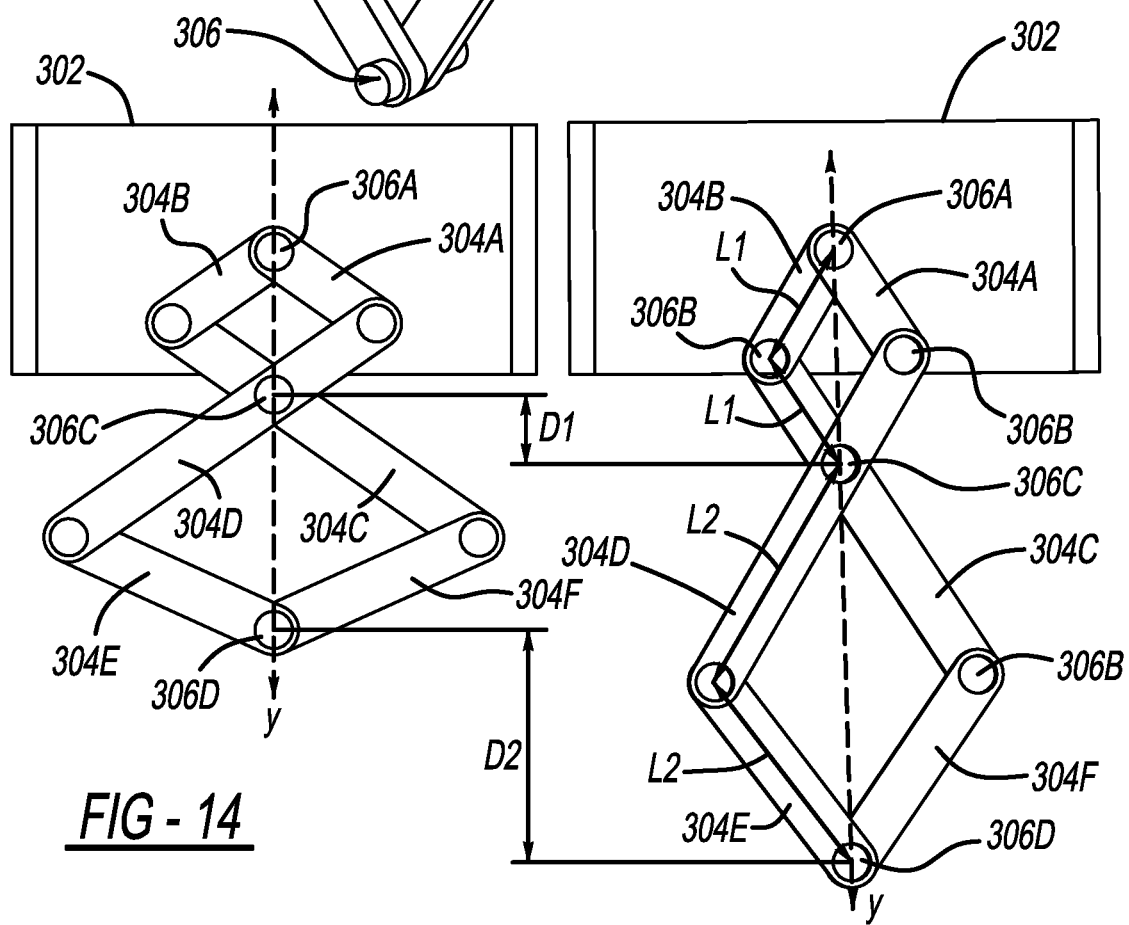
FIG. 14 illustrates a movement of the scissor linkage amplifier of FIG. 13.
Figure 15:
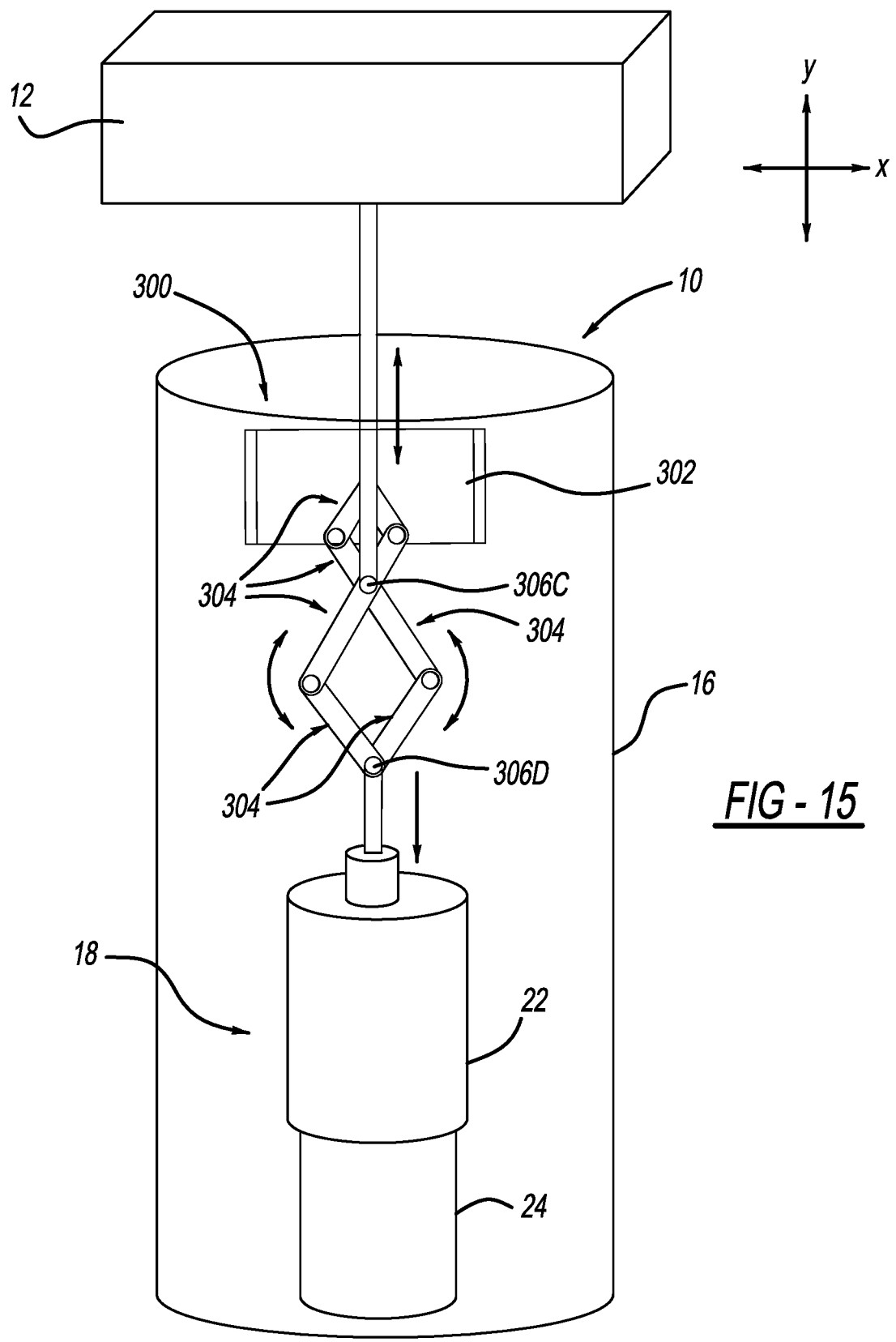
FIG. 15 illustrates the scissor linkage amplifier of FIG. 13 coupled to the vibration source and the transducer.

FIGS. 13-15 depict an example embodiment of a scissor linkage amplifier 300 which can be used as the amplifier 20 in the energy harvester 10. The scissor linkage amplifier 300 includes a frame 302, and a plurality of links 304 (304A-304F) connected at multiple joints 306. The frame 302 is attached to the housing 16. The links 304 and the joints 306 are configured such that the scissor linkage amplifier 300 has link lengths of L1 and L2, where the length is measured between two joints 306 and L1<L2.

The joints 306 include a fixed joint 306A, transferring joints 306B, an input joint 306C, and an output joint 306D. The fixed joint 306A is coupled to the frame 302. The links 304A-304F pivot about the joints 306 or, in other words, about the z-axis. As the input member 32, the input joint 306C is coupled to the vibration source 12. As the output member 34, the output joint 306D is coupled to the transducer 18. In the example, embodiment, the input joint 306C and the output joint 306D are depicted as having a rod or a peg which can be used to couple to vibration source 12 and the transducer 18, respectively. It is understood that other attachments means may be used to couple the scissor linkage amplifier 300 to the vibration source 12 and the transducer 18.

As the transmission member 36, the links 304 move in a scissor like movement about the y-axis in response to the motion received at the input joint 306C from the vibration source 12. The input joint 306C and the output joint 306D are positioned along the y-axis, and the transferring joints 306B are symmetrically positioned on either side of the y-axis (FIG. 14). As the links 304C, 304D move, the joints 306B move toward or away from the y-axis. When the joints 306B move away from the y-axis, a length of the scissor linkage amplifier 300 measured along the y-axis decreases, and as the joints 306B move toward the y-axis, the length of the scissor linkage amplifier 300 increases.

The input joint 306C couples the links 304C, 304D. Specifically, links 304C, 304D are each separated into two sub-links having the length L1 and L2. The L2 portion of the links 304C, 304D are coupled to links 304F, 304E which have a length of L2. The links 304F, 304E are coupled at the output joint 306D.

In operation, the energy harvester 10 having the scissor linkage amplifier 300 as the amplifier 20 receives a motion from the vibration source 12 which moves the transducer 18. Specifically, the motion from the vibration source 12 is applied to the links 304C, 304D via the input joint 306C. In response to the motion, the links 304 pivot about respective joints 306, such that the input joint 306C and the output joint 306D move along the y-axis (FIGS. 14 and 15). Accordingly, the output joint 306D moves the first part 22 of the transducer 18 along the central axis 26 which is parallel with the y-axis. Due to the arrangement of the links 304 and the length of the links coupling the input joint 306C and the output joint 306D, the input joint 306C moves a distance D1, while the output joint 306D moves a distance D2 which is greater than D2 (FIG. 14).

The scissor linkage amplifier 300 has a gain G that can be calculated by Equation 3, shown below, where $n_{1-output}$ and $n_{2-output}$ are the numbers of links with length of L1 and L2, respectively, between the fixed joint 306A and the output joint 306D, and $n_{1-input}$ and $n_{2-input}$ are the numbers of links with length of L1 and L2, respectively between the fixed joint 306A and the input joint 306C.

$$G = \frac{(n_{1-output} \times L1 + n_{2-output} \times L2)}{(n_{1-input} \times L1 + n_{2-input} \times L2)} \qquad \text{Equation 3}$$

Figure 16:
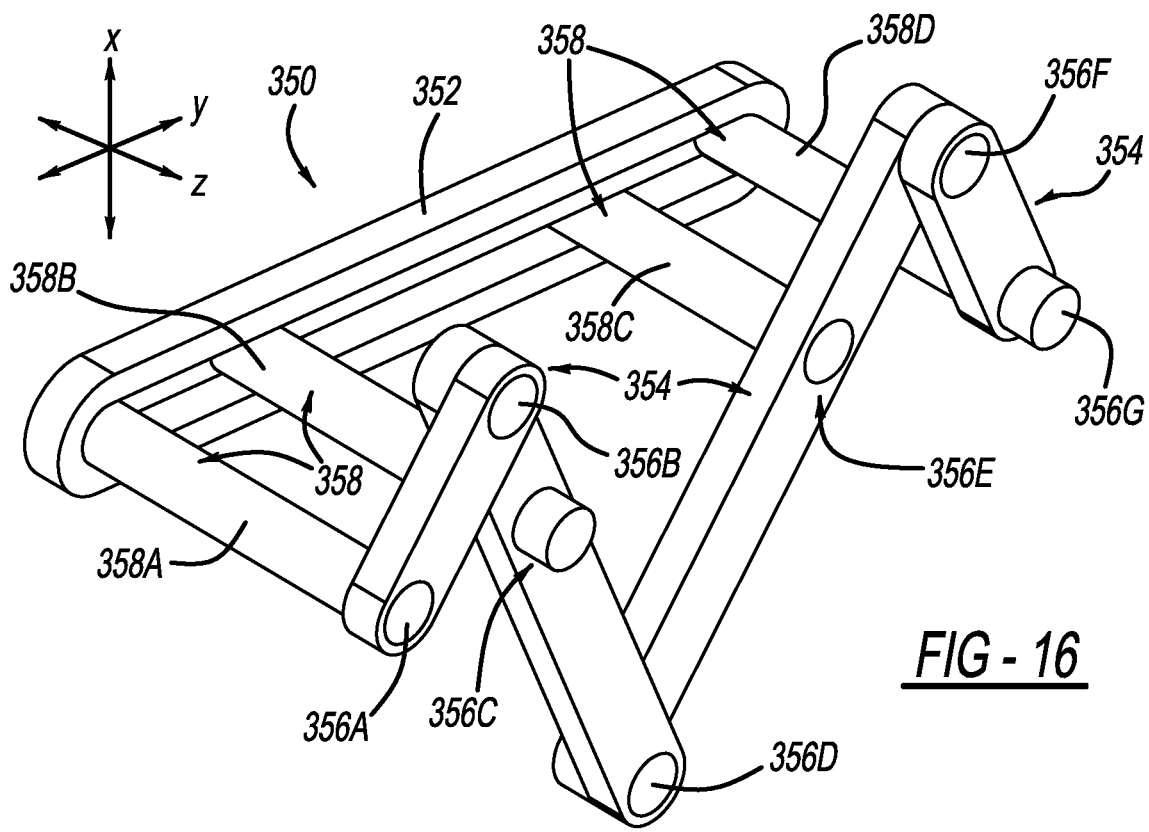
FIG. 16 is a perspective view of a scissor-slider linkage amplifier.
Figure 17:
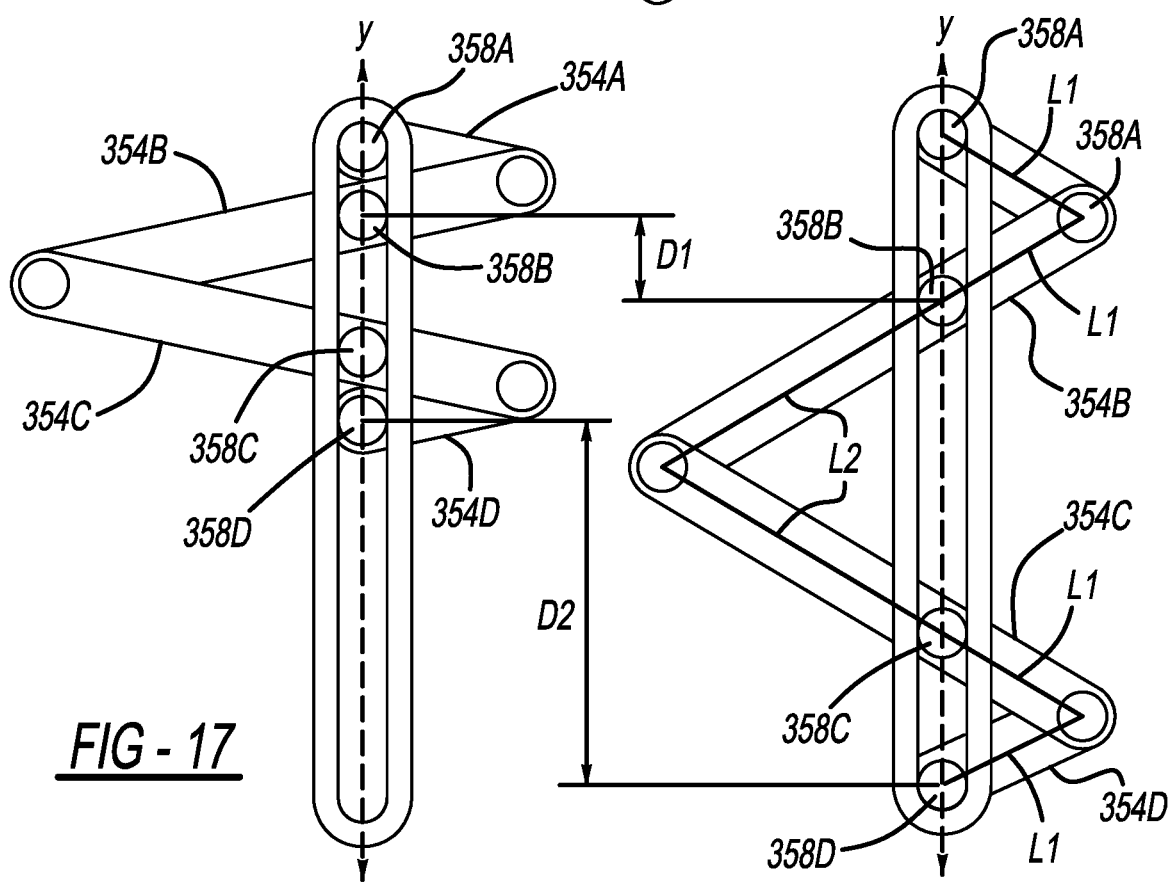
FIG. 17 illustrates a movement of the scissor-slider linkage amplifier of FIG. 16.
Figure 18:
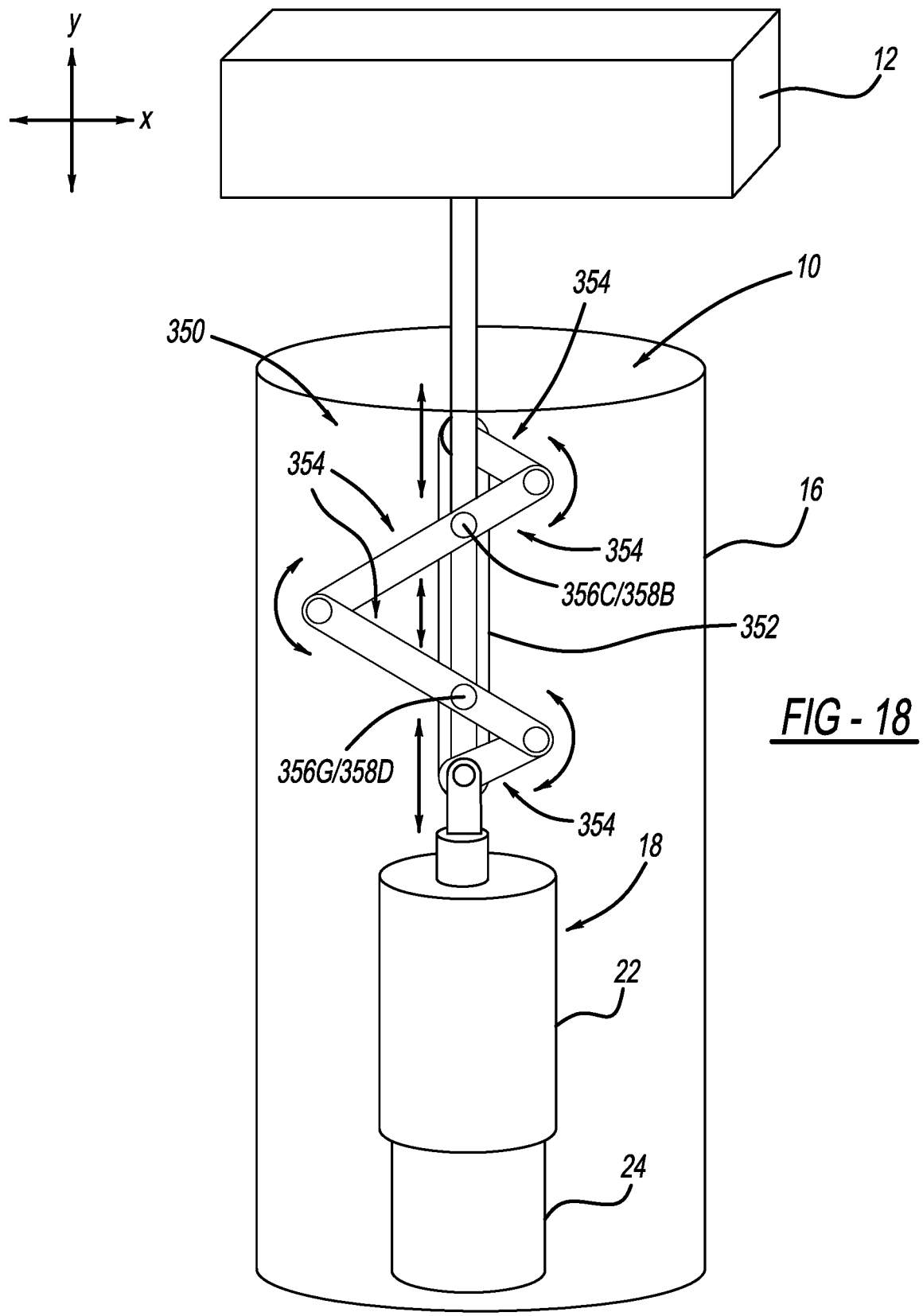
FIG. 18 illustrates the scissor-slider linkage amplifier of FIG. 16 coupled to the vibration source and the transducer.

FIGS. 16-18 depict an example embodiment of a scissor-slider linkage amplifier 350 which can be used as the amplifier 20 in the energy harvester 10. The scissor-slider linkage amplifier 350 includes a slider 352, a plurality of links 354 (354A-354D), and a plurality of joints 356 (356A-356G). The slider 352 defines a path along which the links 354 and the joints 356 extend and retract. The slider 352 is coupled to the housing 16, and has its longitudinal axis parallel with the y-axis.

The links 354 are coupled to the slider 352 via rods 358 (358A-358D). The rods 358 include a fixed rod 358A, an input rod 358B, an alignment rod 358C, and an output rod 358D. The fixed rod 358A is stationary and does not slide along the slider 352. The fixed rod 358A is coupled to one end of the link 354A at joint 356A. The link 354A pivots about the joint 356A.

As the input member 32, the input rod 358B is coupled to the vibration source 12 at joint 356C. The input rod 358B is attached to link 354B at joint 356C, and travels along the slider 352. As the output member 34, the output rod 358D is coupled to the transducer 18 at joint 356G. Specifically, the output rod 358D is coupled to the first part 22 of the transducer 18. The output rod 358D is attached to link 354D at joint 356G, and travels along the slider 352.

As the transmission member 36, the links 354 are coupled to each other via joints 356B, 356D, and 356F. The links 354 rotate about the joints 356A, 356B, 356D, 356F, and 356G. The rods 358B-358D move along the slider 352 based on the movement of the links 354 (FIG. 17). The links 354 and the joints 356 are configured such that the slider scissor linkage amplifier 350 has link lengths of L1 or L2 (L1<L2), where the link length is measured between two joints 356.

In operation, the energy harvester 10 having the slider scissor linkage amplifier 350 as the amplifier 20 receives a motion from the vibration source 12 and moves the transducer 18. Specifically, the motion from the vibration source 12 is applied to the rod 358B and link 354B via the joint 356C. In response to the motion, the links 354 pivot about respective joints 356 and extend/retract, thereby moving the rods 358B-358D along the slider 352 as indicated by the arrows in FIG. 18. Accordingly, the output rod 358D moves the first part 22 of the transducer 18 along the central axis 26 which is parallel with the y-axis. Due to the arrangement of the links 354 and the length of the links coupling the input rod 358B and the output rod 358D, the input rod 358B moves a distance D1, while the output rod 358D moves a distance D2 which is greater than D1 (FIG. 17).

The gain G of the slider scissor linkage amplifier 350 can be determined using Equation 3. The slider scissor linkage amplifier 350 performs in a similar manner as the scissor slider linkage amplifier 350 but is less complex. In particular, the use of the slider 352 reduces the number of links while maintaining the same gain.

The scissor linkage amplifier 300 and the slider scissor linkage amplifier 350 can accommodate higher vibrational displacement (up to 2×L1) than the symmetrical level amplifier 200 and the asymmetrical lever amplifier 250. The gain is linear and independent of the initial position of the input or the output joints. To increase the gain of scissor linkage amplifier 300 or the slider scissor linkage amplifier 350, the number of links and joints may be increased.

In the example embodiment the input members 32 and output members 34 of the scissor linkage amplifier 300 and the slider scissor linkage amplifier 350 are positioned on the same side relative to the fixed joint/rod. Alternatively, the input members 32 may positioned on the opposite side of the fixed joint/rod. For example, for the scissor linkage amplifier 300, the joint 306A can be chosen as input joint and the joint 306C as the fixed joint. Such configuration maintains the same gain but changes the direction of the input and output movements. Specifically, the output member 34 moves in a direction opposite to the input member 32. For example, if the input member 32 moves up (i.e., a first direction) the output member 34 moves down (i.e., second direction opposite of the first direction). Similarly, for the slider scissor linkage amplifier 350, the rod 358B can be the fixed rod and rod 358A can be the input rod which is coupled to the vibration source 12.

Figure 21:
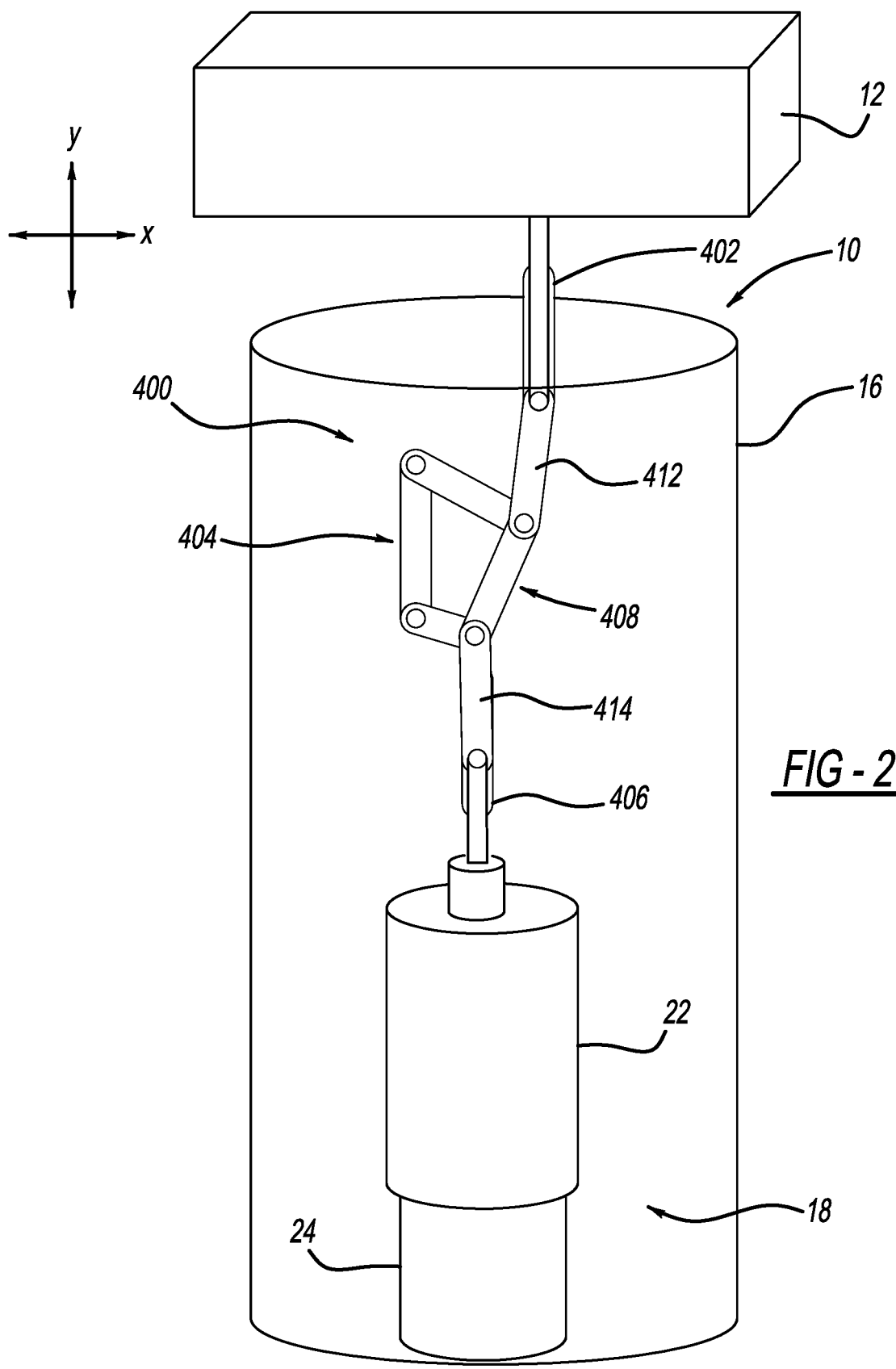
FIG. 21 illustrates the four-bar linkage amplifier of FIG. 19 coupled to the vibration source and the transducer.

FIGS. 19-21 depict an example embodiment of a four-bar linkage amplifier 400 which can be used as the amplifier 20 in the energy harvester 10. The four bar linkage amplifier 400 includes an input slider 402, a linkage assembly 404, and an output slider 406. The linkage assembly 404 includes a four-bar linkage 408 having four links 410A-410D, a driving link 412, and a driven link 414. The input slider 402 and the output slider 406 are attached to the housing 16. The input slider 402 and the output slider 406 extend along an axis parallel with the y-axis.

As the input member 32, the driving link 412 is coupled to the vibration source 12. The driving link 412 is also coupled to the input slider 402, such that the driving link 412 travels along the input slider 402. As the output member 34, the driven link 414 is coupled to the transducer 18, or more particularly, the first part 22 of the transducer 18. The driven link 414 is also coupled to the output slider 406, such that the driven link 414 travels along the output slider 406.

As the transmission member 36, the four-bar linkage 408 has four links 410, which may vary in length and are coupled together at four joints 416A-416B to form a loop. The four-bar linkage includes a base link 410A, a receiving link 410B, a transferring link 410C, and a coupler link 410D. The base link 410A may be attached to the housing 16, and is stationary (i.e., does not pivot). The receiving link 410B is coupled to the driving link 412 and the base link 410. The receiving link 410B pivots about joints 416A and 416B. The transferring link 410C is coupled to the driven link 414 and the base link 410. The transferring link 410C pivots about joints 416C and 416D. The coupler link 410D couples the receiving link 410B and the transferring link 410C. The coupler link 410D pivots about joints 416A and 416C.

As the driving link 412 travels along the slider 402 in a direction parallel with the y-axis, the driving link 412 moves the receiving link 410B and the transferring link 410C. The receiving link 410B and the transferring link 410C move in parallel motion. For example, if the driving link 412 travels in a direction towards the output slider 406, the receiving link 410B and the transferring link 410C pivot about the joints 416A and 416C toward the output slider 406, thereby moving the driven link 414 (FIG. 20).

In operation, the energy harvester 10 having the four-bar linkage amplifier 400 as the amplifier 20 receives a motion from the vibration source 12 and moves the transducer 18. Specifically, the motion from the vibration source 12 is applied to the driving link 412. In response to the motion, the driving link 412 travels along the input slider 402 and moves the four-bar linkage 408. The four-bar linkage 408 transfers an amplified movement to the driven link 414, which travels along the output slider 406. Accordingly, the driven link 414 moves the first part 22 of the transducer 18 along the central axis 26 which is parallel with the y-axis. Due to the four-bar linkage 408 of the linkage assembly 404, driving link 412 moves a distance D1, while the driven link 414 moves a distance D2, which is greater than D2 (FIG. 20). The gain G provided by a four-bar linkage amplifier 400 depends upon the length of each link (410A-410D, 412, 414), and the distance of the sliders 402, 406 from the base link 410A.

Figure 22:
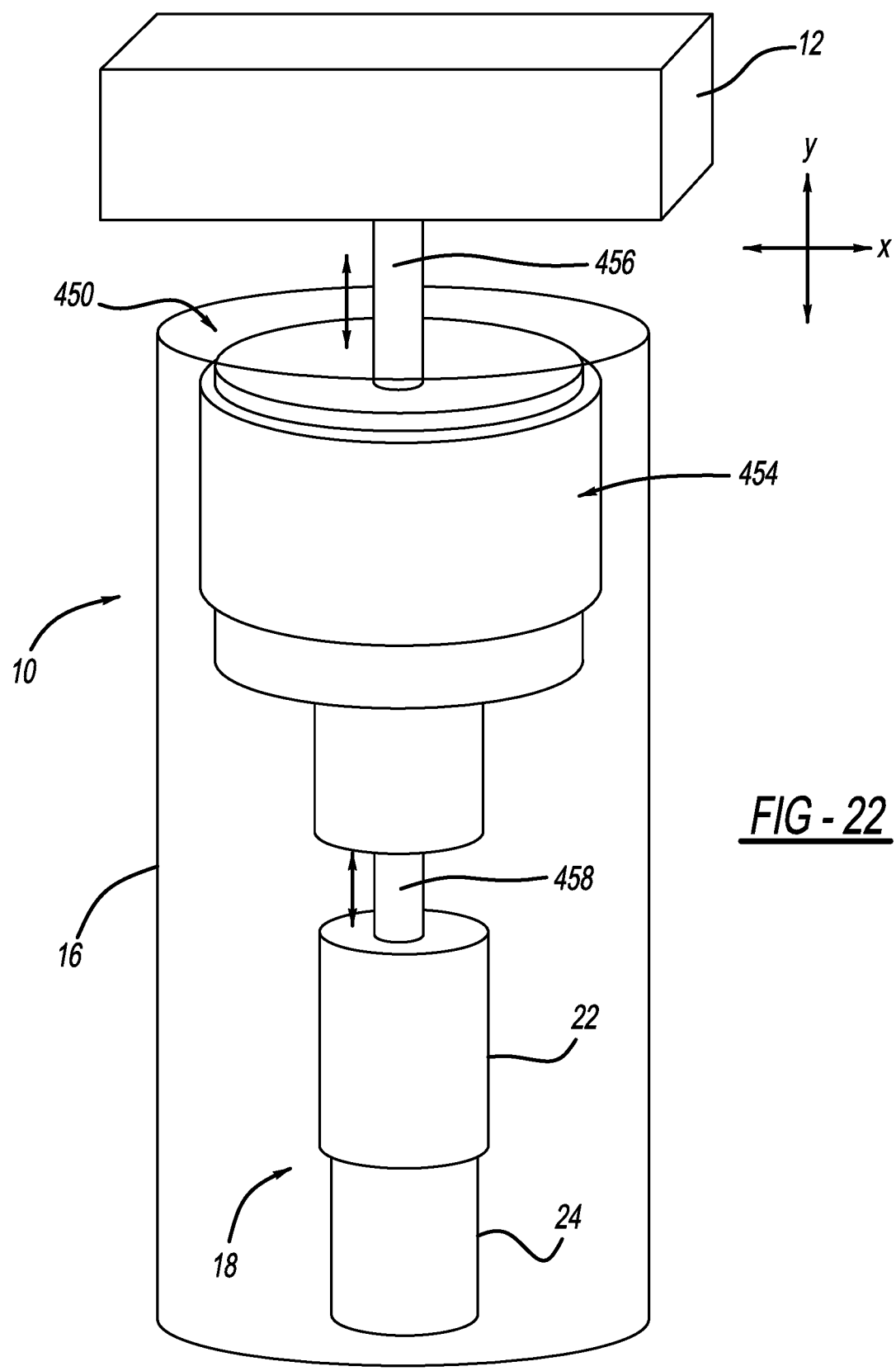
FIG. 22 illustrates a hydraulic pump amplifier coupled to the vibration source and the transducer.
Figure 23:
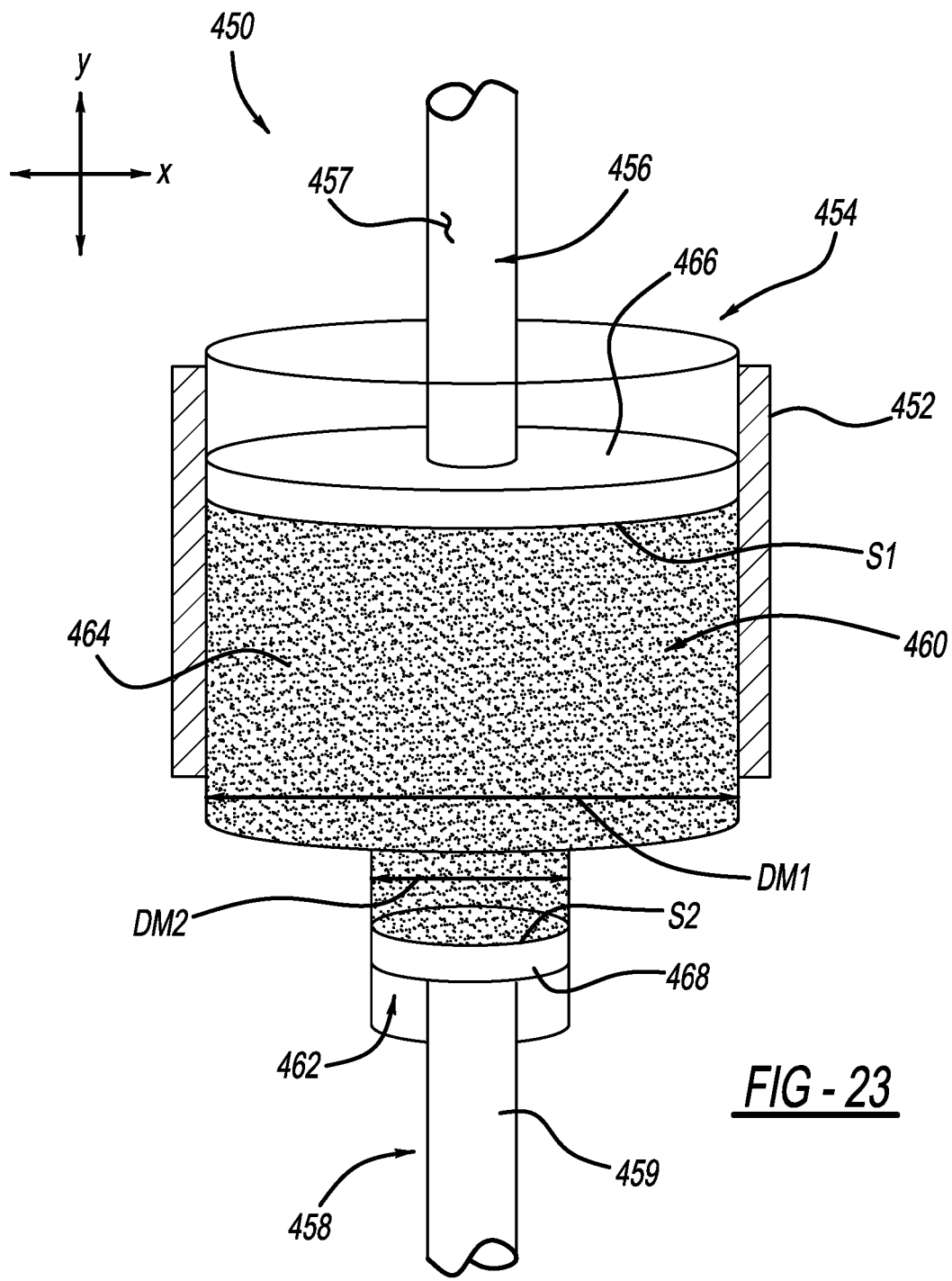
FIG. 23 illustrates a partial cross-sectional view of the hydraulic pump amplifier of FIG. 22.

FIGS. 22 and 23 depict an example embodiment of a hydraulic pump amplifier 450 which can be used as the amplifier 20 in the energy harvester 10. The hydraulic pump amplifier 450 includes a frame 452 which is coupled to the housing 16, a hydraulic pump 454, an input piston 456, and an output piston 458. The input piston 456 and the output piston 458 move within the hydraulic pump 454 along the y-axis.

As the input member 32, the input piston 456 is coupled to the vibration source 12 via a driving handle 457. The input piston 456 further has a driving plate 466 coupled to the other end of the driving handle 457. As the output member 34, the output piston 458 is coupled to the transducer 18, or more particularly, the first part 22 of the transducer 18 via a driven handle 459. The output piston 458 further has a driven plate 468 coupled to the other end of the driven handle 459.

As the transmission member 36, the hydraulic pump 454 defines a first chamber 460 and a second chamber 462. The first chamber 460 has an area larger than the second chamber 462. For example, in the example embodiment, the hydraulic pump 454 has a cylindrical shape with varying diameters. Specifically, the first chamber 460 of the hydraulic pump 454 has a diameter DM1 and the second chamber 462 has a diameter DM2 which is smaller than DM1 (DM2<DM1). It is understood that the hydraulic pump 454 may have other suitable shapes, such as a cuboid, and is not limited to a cylindrical shape. The hydraulic pump 454 houses hydraulic fluid 464 within the first chamber 460 and the second chamber 462. The fluid 464 flows between the first chamber 460 and the second chamber 462 in accordance with a movement of the input piston 456 as described herein.

The driving plate 466 has a surface S1 and the driven plate 468 has a surface S2. The area of the surface S1 is larger than the area of the surface S2. As the input piston 456 travels within the first chamber 460, the output piston 458 is driven by the fluid 464 which is displaced by the input piston 456. More particularly, as the input piston 456 moves within the first chamber 460 of the hydraulic pump 454, the driving plate 466 displaces the fluid 464 by either pushing the fluid 464 into the second chamber 462 or drawing the fluid 464 from the second chamber 462. The movement of the fluid 464 between the first chamber and the second chamber 462 moves the output piston 458.

In operation, the energy harvester 10 having the hydraulic pump amplifier 450 as the amplifier 20 receives a motion from the vibration source 12 which moves the transducer 18. Specifically, the motion from the vibration source 12 exerts a movement upon the input piston 456. In response to the motion, the input piston 456 moves within the first chamber 460, thereby displaying the fluid 464. The fluid 464 displaced by the input piston 456 exerts a force onto the output piston 458, thereby moving the output piston 458. As the output piston 458 moves in the second chamber 462, the first part 22 of the transducer 18 moves along the central axis 26 which is parallel with the y-axis.

Due to the different size chambers of the hydraulic pump 454, the amount of movement of the input piston 456 within the first chamber 460 is less than the movement of the output piston 458. Specifically, the hydraulic pump amplifier 450 has a gain G substantially equal to the area of the surface S1 of the driving plate 466 over the area of the surface S2 of the driven plate (G≈S1/S2). Accordingly, the distance travelled by the input piston 456 in response to the motion from the vibration source 12 is less than the distance travelled by the output piston 458 in response to the fluid 464 displaced by the input piston 456. Thus, the transducer 18 receives an amplified motion from the output piston 458.

The hydraulic pump amplifier 450 provides the same mechanical gain independent of the initial position of the input piston 456 and the output piston 458. The hydraulic pump amplifier 450 has a simpler design than the concentric gear amplifier 100 and the gear-crank amplifier 150.

Each of the amplifiers (100, 150, 200, 250, 300, 350, 400, 450) described herein employ a mechanical configuration to increase the amplitude of a motion from the vibration source 12. More particularly, a movement of the input member 32 can be increased by, for example, a gear system, a lever system, a series of links, or a hydraulic pump, and transferred to the output member 34. Thus, the amplifier increases the motion transmitted from the vibration source 12, such that the transducer 18, in response to the output member 34, moves a distance greater than the distance travelled by the input member 32 in response to the vibration source 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, and devices to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, operations, elements, and/or components, but do not preclude the presence or addition of one or more other features, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An energy harvester coupled to a vibration source, the energy harvester comprising:
   a housing;
   a transducer generating an electrical signal, the transducer residing in the housing and having a movable part and a fixed part,
      wherein the fixed part is mechanically coupled to the housing, and
      wherein the movable part is configured to move slidably relative to the fixed part along a central axis from a first position to a second position in response to a motion received from the vibration source to generate the electrical signal; and
   an amplifier coupled to and residing in the housing and operable to amplify an amplitude of the motion received from the vibration source,
      wherein the motion received from the vibration source is bidirectional,
      wherein the amplifier has an input member coupled to the vibration source and an output member coupled to the movable part of the transducer, wherein the input member moves at a distance D1 in response to the motion received from the vibration source, and the output member moves the movable part of the transducer in response to the input member moving, wherein the movable part of the transducer moves relative to the fixed part of the transducer along the central axis by a distance D2 which is greater than distance D1, wherein the transducer includes a magnet and a coil and the magnet and coil are each disposed within the fixed part of the transducer, and wherein one of the magnet and the coil is coupled to the fixed part and the other of the magnet and the coil is coupled to the movable part, such that the magnet and the coil move relative to each other within the fixed part so as to generate an electrical potential across the coil.

2. The energy harvester of claim 1 wherein the amplifier includes:
a plurality of links, and
a plurality of joints that join two or more links from among the plurality of links to form a linkage assembly having a first end and a second end, the linkage assembly moving in a predefined motion in response to the motion received from the vibration source,
wherein the input member is coupled to the first end of the linkage assembly and the output member is coupled to the second end of the linkage assembly.

3. The energy harvester of claim 2 wherein the amplifier includes:
an input slider coupled to the housing, wherein the first end of the linkage assembly slidingly moves along the input slider, and
an output slider coupled to the housing, wherein the second end of the linkage assembly slidingly moves along the output slider,
wherein the first end of the linkage assembly is coupled to the vibration source via the input member, and the second end of the linkage assembly is coupled to the movable part of the transducer via the output member.

4. The energy harvester of claim 2 wherein the amplifier includes;
a slider coupled to the housing, and
a plurality of rods, wherein the rods couple the linkage assembly to the slider such that the linkage assembly moves along the slider, a first rod from among the plurality of rods is coupled to the vibration source via the input member, a second rod from among the plurality of rods is coupled to the movable part of the transducer via the output member, and the first rod and the second rod move along the slider in response to the motion received from the vibration source such that the first rod moves the distance D1 and the second rod moves the distance D2 which is greater than D1.

5. The energy harvester of claim 1 wherein the amplifier includes:
a hydraulic pump that has a body, the body defines a first chamber and a second chamber smaller than the first chamber, and the body retains hydraulic fluid,
an input piston that moves within the first chamber of the hydraulic pump, the input piston acting as the input member, the input piston being coupled to the vibration source, and
an output piston that moves within the second chamber of the hydraulic pump, the output piston acting as the output member, the output piston being coupled to the movable part of the transducer,
wherein the input piston displaces the hydraulic fluid in the hydraulic pump in response to the motion received from the vibration source, and the hydraulic pump displaces the output piston in response to the input piston moving.

6. The energy harvester of claim 5 wherein the input piston has a surface size of S1 and the output piston has a surface size of S2 which is less than the surface size of S1, the input piston travels the distance D1 in response to the motion received from the vibration source and the output piston travels the distance D2 in response to the hydraulic fluid displaced by the input piston, and a quotient of the distance D2 divided by the distance D1 is substantially proportional to a quotient of the surface size of S1 divided by the surface size of S2.

7. The energy harvester of claim 1 wherein the amplifier includes:
a frame coupled to the housing,
a shaft coupled to the frame, the shaft pivotable about a central shaft axis, and
a lever coupled to the shaft, wherein the lever pivots with the shaft about the central shaft axis, the lever being coupled to the vibration source via the input member and coupled to the movable part of the transducer via the output member such that the vibration source is coupled to the lever at a first length L1 from the central shaft axis and the movable part of the transducer is coupled to the lever at a second length L2 from the central shaft axis, wherein the second length L2 is greater than the first length L1.

8. The energy harvester of claim 7 wherein a quotient of the distance D2 travelled by the movable part of the transducer divided by the distance D1 travelled by the input member is substantially proportional to a quotient of the first length L1 divided by the second length L2.

9. The energy harvester of claim 1 wherein the amplifier includes:
a frame coupled to the housing,
a shaft coupled to the frame, the shaft pivotable about a central shaft axis,
a first link coupled to the shaft, the first link having two opposing ends, the first link acting as the input member, the first link being coupled to the shaft at one end of the two opposing ends and the first link being coupled to the vibration source at another end of the two opposing ends, and
a second link coupled to the shaft, the second link having two opposing ends, the second link acting as the output member, the second link being coupled to the shaft at one end of the two opposing ends and the second link being coupled to the movable part of the transducer at another end of the two opposing ends,
wherein the first link and the second link move along an axis parallel with the central axis in response to the shaft pivoting about the central shaft axis, and the first link is coupled to the shaft at a first length L1 from the central shaft axis and the second link is coupled to the shaft at a second length L2 from the central shaft axis, wherein the second length L2 is greater than the first length L1.

10. The energy harvester of claim 9 wherein a quotient of the distance D2 travelled by the movable part of the transducer divided by the distance D1 travelled by the input member is substantially proportional to a quotient of the first length L1 divided by the second length L2.

11. The energy harvester of claim 1 wherein the amplifier includes a gear assembly that has a first disk with a diameter equal to the distance D1 and a second disk with a diameter equal to the distance D2 which is greater than D1, the first disk and the second disk are concentrically disposed with each other and are coupled to each other such that as the first disk rotates, the second disk rotates, wherein the input member is a first rack, the first rack having two opposing ends, a first end of the two opposing ends configured to interface with the first disk of the gear assembly, and a second end of the two opposing ends coupled to the vibration source, wherein the output member is a second rack, the second rack having two opposing ends, a first end of the two opposing ends configured to interface with the second disk of the gear assembly, and a second end of the two opposing ends coupled to movable part of the transducer, and wherein the input member moves along an axis parallel with the central axis in response to the motion received from the vibration source, the gear assembly rotates in response to the input member moving, the output member moves along the axis parallel with the central axis in response to the gear assembly rotating, and the movable part of the transducer moves relative to the fixed part of the transducer along the central axis in response to the output member moving.

12. The energy harvester of claim 1 wherein the amplifier includes a gear assembly that has a first disk with a diameter equal to the distance D1 and a second disk with a diameter equal to the distance D2 which is greater than D1, wherein the first disk and the second disk are concentrically disposed with each other and are coupled to each other such that as the first disk rotates, the second disk rotates, wherein the input member is a rack having two opposing ends, wherein the rack interfaces with the first disk of the gear assembly at one end of the two opposing ends of the rack and is coupled to the vibration source at the other end of the two opposing ends of the rack, wherein the output member has two opposing ends and is coupled to a surface of the second disk at one end of the two opposing ends of the output member and is coupled to the movable part of the transducer at the other end of the two opposing ends of the output member, and wherein the input member moves along an axis parallel with the central axis in response to the motion received from the vibration source, the gear assembly rotates in response to the input member moving, and the output member moves in a piston-like motion as the gear assembly rotates such that the other end of the two opposing ends of the output member coupled to the movable part of the transducer moves along the axis parallel with the central axis.

13. An energy harvester coupled to a vibration source, the energy harvester comprising:

a housing;

a transducer generating an electrical signal, the transducer residing in the housing and having a first part and a second part, wherein the first part and the second part are configured to move relative to each other along a central axis in response to a motion received from the vibration source to generate the electrical signal; and an amplifier coupled to the housing and operable to amplify an amplitude of the motion received from the vibration source, the amplifier including a gear assembly, an input member, and an output member, wherein the gear assembly has a first disk with a diameter D1 and a second disk with a diameter D2 which is greater than the diameter D1, the first disk and the second disk being concentrically positioned with each other, the input member has two opposing ends and interfaces with the first disk of the gear assembly at one end of the two opposing ends of the input member and is coupled to the vibration source at the other end of the two opposing ends of the input member, the output member has two opposing ends and interfaces with the second disk of the gear assembly at one end of the two opposing ends of the output member and is coupled to the first part of the transducer at the other end of the two opposing ends of the output member, the input member moves along an axis parallel with the central axis in response to the motion received from the vibration source, the gear assembly rotates in response to the input member moving, the output member moves along the axis parallel with the central axis in response to the gear assembly rotating, and the first part of the transducer moves relative to the second part of the transducer along the central axis in response to the output member moving such that a distance travelled by the first part of the transducer is greater than a distance travelled by the input member in response to the motion received from the vibration source.

14. The energy harvester of claim 13 wherein the one end of the two opposing ends of the output member is coupled to a surface of the second disk, and wherein the output member moves in a piston-like motion as the second disk of the gear assembly rotates in response to the input member moving such that the other end of the two opposing ends of output member coupled to the first part of the transducer moves along the axis parallel with the central axis.

15. The energy harvester of claim 13 wherein the first disk and the second disk of the gear assembly each have teeth, the input member is a rack that engages with the teeth of the first disk of the gear assembly, and the output member is a rack that engages with the teeth of the second disk of the gear assembly.

16. The energy harvester of claim 13 wherein the distance travelled by the first part of the transducer is a first distance and the distance travelled by the input member is a second distance and a difference between the first distance and the second distance is substantially proportional to a quotient of the diameter D2 divided by the diameter D1.

* * * * *